US010461586B2

(12) United States Patent
Shirani-Mehr et al.

(10) Patent No.: US 10,461,586 B2
(45) Date of Patent: Oct. 29, 2019

(54) METHODS AND APPARATUS FOR CROSS CONNECTION DETECTION AND MITIGATION IN WIRELESS POWER TRANSFER NETWORKS

(71) Applicant: Intel Corporation, Santa Clara, CA (US)

(72) Inventors: Hooman Shirani-Mehr, Portland, OR (US); Ahmad Farbod Khoshnevis, Portland, OR (US); Xintian E. Lin, Mountain View, CA (US); Sreenivas Kasturi, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 454 days.

(21) Appl. No.: 15/087,660

(22) Filed: Mar. 31, 2016

(65) Prior Publication Data
US 2017/0288471 A1   Oct. 5, 2017

(51) Int. Cl.
| | |
|---|---|
| *H01F 37/00* | (2006.01) |
| *H01F 38/00* | (2006.01) |
| *H01F 27/42* | (2006.01) |
| *H02J 50/80* | (2016.01) |
| *H04L 12/24* | (2006.01) |
| *H02J 7/02* | (2016.01) |
| *H02J 50/10* | (2016.01) |
| *H04L 12/10* | (2006.01) |

(52) U.S. Cl.
CPC ............. *H02J 50/80* (2016.02); *H02J 7/025* (2013.01); *H02J 50/10* (2016.02); *H04L 41/12* (2013.01); *H04L 12/10* (2013.01)

(58) Field of Classification Search
CPC . H02J 50/10; H02J 50/80; H02J 7/025; H04L 41/12; H04L 12/10; H04W 8/005
USPC .......................................................... 307/104
See application file for complete search history.

(56) References Cited

U.S. PATENT DOCUMENTS

| | | |
|---|---|---|
| 8,102,799 B2 | 1/2012 | Alexander et al. |
| 8,504,639 B2 | 8/2013 | Cochard et al. |
| 2008/0162697 A1 | 7/2008 | Griffin et al. |
| 2008/0181184 A1 | 7/2008 | Kezys |
| 2011/0115432 A1 | 5/2011 | El-Maleh et al. |
| 2012/0112539 A1 | 5/2012 | Yamamoto |
| 2012/0299557 A1 | 11/2012 | Kwon et al. |

(Continued)

OTHER PUBLICATIONS

International Searching Authority, "International Search Report and Written Opinion," issued in connection with application No. PCT/US2017/017814 dated May 18, 2017, 14 pages.

(Continued)

*Primary Examiner* — Rexford N Barnie
*Assistant Examiner* — Toan Vu
(74) *Attorney, Agent, or Firm* — Hanley, Flight & Zimmerman, LLC

(57) ABSTRACT

Methods and apparatus for cross connection detection and mitigation in wireless power transfer networks are disclosed. An example method includes receiving communication data from the second PTU, the communication data being generated by the PRU, wherein the first PTU and the second PTU are capable of providing wireless power to power receiving units; determining that the communication data is intended for the first PTU based on the connected device mapping; and transmitting the communication data to the first PTU.

20 Claims, 13 Drawing Sheets

(56) References Cited

U.S. PATENT DOCUMENTS

| | | | |
|---|---|---|---|
| 2013/0082653 A1 | 4/2013 | Lee et al. | |
| 2013/0119778 A1 | 5/2013 | Jung | |
| 2014/0128107 A1 | 5/2014 | An | |
| 2014/0159653 A1 | 6/2014 | Von Novak et al. | |
| 2014/0203770 A1 | 7/2014 | Salter et al. | |
| 2014/0206384 A1* | 7/2014 | Kim | H04W 64/00 455/456.1 |
| 2014/0285142 A1 | 9/2014 | Lee et al. | |
| 2014/0306657 A1 | 10/2014 | Lundgren et al. | |
| 2015/0035373 A1* | 2/2015 | Chen | H04B 5/0037 307/104 |
| 2015/0066640 A1* | 3/2015 | Jung | G06Q 30/0251 705/14.49 |
| 2015/0118962 A1* | 4/2015 | Chu | H04B 5/0056 455/41.1 |
| 2015/0326025 A1 | 11/2015 | Bell et al. | |
| 2015/0380974 A1 | 12/2015 | Lin et al. | |
| 2016/0049826 A1* | 2/2016 | Lee | H02J 7/025 320/108 |
| 2016/0126748 A1 | 5/2016 | Park et al. | |
| 2017/0005520 A1 | 1/2017 | Zeine et al. | |
| 2017/0043675 A1 | 2/2017 | Jones et al. | |
| 2017/0187198 A1 | 6/2017 | Leabman | |

OTHER PUBLICATIONS

International Searching Authority, "International Search Report and Written Opinion," issued in connection with application No. PCT/US2017/017811 dated May 18, 2017, 12 pages.

The United States Patent and Trademark Office, "Final Office Action," issued in connection with U.S. Appl. No. 15/087,632, dated May 18, 2018, 16 pages.

The United States Patent and Trademark Office, "Non-Final Office Action," issued in connection with U.S. Appl. No. 15/087,632, dated Nov. 17, 2017, 12 pages.

Dictionary.com, "Definition of available," retrieved on Oct. 18, 2018, 1 page.

The International Bureau of WIPO, "International Preliminary Report on Patentability," issued in connection with application No. PCT/US2017/017814, dated Oct. 2, 2018, 9 pages.

The International Bureau of WIPO, "International Preliminary Report on Patentability," issued in connection with application No. PCT/US2017/017811, dated Oct. 2, 2018, 8 pages.

* cited by examiner

METHODS AND APPARATUS FOR CROSS CONNECTION DETECTION AND MITIGATION IN WIRELESS POWER TRANSFER NETWORKS

FIELD OF THE DISCLOSURE

This disclosure relates generally to wireless power transfer and, more particularly, to methods and apparatus for cross connection detection and mitigation in wireless power transfer networks.

BACKGROUND

Wireless charging stations have grown in popularity over the past few years. Wireless power stations are now more readily available to wirelessly charge computing devices (e.g., laptops, mobile devices, tablets, etc.). Wireless charging stations connect to a computing device using two connections. The first connection is a power connection to charge the computing device. The second connection is a communication connection to communicate data related to a power signal associated with the power connection. To wirelessly charge a computing device using traditional techniques, the first and second connections must be established via the same wireless charging station. Cross connection occurs when a computing device has a power connection from a first wireless charging station, but the computing device is communicating via a communication connection from a second wireless charging station. Cross connection prevents the first and/or second charging stations from properly powering/charging the computing device because the wireless charging station associated with the power connection cannot communicate with the computing device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
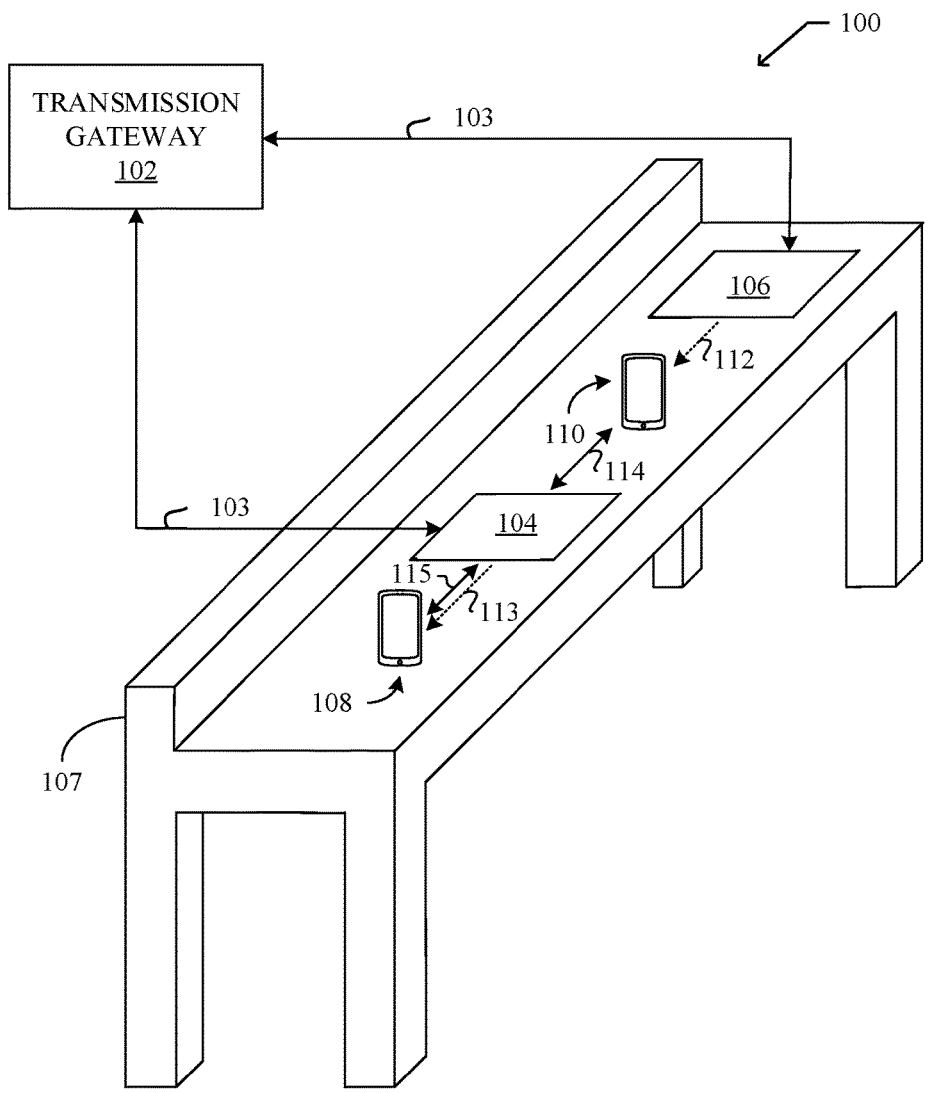
FIG. 1 is an example illustration of an environment to detect and mitigate a cross connection in a wireless power transfer network.

A wireless charging station is an electrical device that includes a power transmitting unit (PTU) (e.g., a transmitter) to provide power to charge one or more electronic (e.g., computing) devices with power receiving units (PRUs) (e.g., receivers). For example, a PRU of an electronic device outputs an advertisement (e.g. a wireless signal) to establish a communication and power connection with a charging station. If the computing device is within range of a power signal associated with a PTU of a wireless charging station, the example PTU establishes a communication connection (e.g., communication link) between the PTU and the PRU while the computing device receives the power signal via a power connection. A power signal provides power to (e.g., charges) the computing device via the PRU. The PRU and/or the PTU can exchange data related to the power signal (e.g., to increase or decrease the power signal) via the communication link.

At some locations, multiple wireless charging stations may be utilized to maximize the total wireless charging area. For example, a table at a coffee shop may include two or more wireless charging stations equally, or unequally, spread throughout the table. In such an example, a PRU of a computing device can communicate with and receive power from any one of the PTUs of the wireless charging stations. In some examples, the PRU of the computing device communicates with and receives power from the PRU of the closest wireless charging station.

When a computing device is close to two or more wireless charging devices it is possible for cross connection to occur. A cross connection occurs when a PRU of a computing device is receiving power from a first PTU but is communicating with a second PTU. When cross connection occurs, the second PTU (e.g., with the established communication connection to the PRU) cannot control the power being received by the PRU, because the power is associated with the first PTU. Cross connection can lead to decreased power efficiency and a poor user experience. Conventional methods related to cross connection may identify or detect when cross connection occurs; however, conventional methods do not address a cross connection that has occurred. Thus, there are no conventional solutions for mitigating or addressing a cross connection once the cross connection has already occurred.

Examples disclosed herein utilize a transmission gateway to generate a mapping of multiple connected PTUs in a network (e.g., a topology mapping) by communicating with all of the multiple PTUs. The topology mapping tracks a number of PTUs that are operating, a status of the each PTU, an identifier of each PTU, a timestamp, a class of each PTU (e.g., associated with a number of type of computing device that can connect to the PTU), a maximum power of each PTU, a list of PRUs in communication with the PTUs, and/or a mapping of which PTU is connected (e.g., via a communication connection and/or power connection) to which PRU. When a new PTU is powered on and/or added to the network, the PTU transmits data related to the PTU to the transmission gateway. Thus, the topology mapping can be updated at any time.

When a PRU approaches one of the PTUs in the network, the PTU may receive an advertisement from the PRU. In some examples, the PTU runs an initial cross connection detection protocol to determine if there is cross connection for the PRU using protocols disclosed herein. If there is not a cross connection, the PTU communicates with the transmission gateway to add the data associated with the PRU and the connection between the PTU and the PRU to the topology mapping. If there is a cross connection, the PTU sends the data associated with the PRU to the transmission gateway for further processing. As described herein, the transmission gateway may organize cross connection detection for the network of PTU devices to determine which PTU is powering the PRU. In such examples, the transmission gateway may add the PRU data and the cross connection data (e.g., which PTU device is communicating with the PRU and which PTU is powering the PRU) in the topology mapping. In some examples, when a PTU receives an advertisement from a PRU, the PTU may forward the PRU data to the transmission gateway without running an initial cross connection detection protocol.

There are many types of cross connection detection protocols. In some examples, cross connection detection includes increasing/decreasing transmitter current (e.g., the current generated in a coil of the PTU). In such examples, the PTU monitors the rectifier voltage of the PRU for a change corresponding to the change of the transmitter current associated with the PTU. Such an example cross connection protocol is herein referred to as "voltage measurement cross connection detection protocol."

In some examples, the PTU measures the PTU output power and the PRU received power. In such examples, if the PTU output power is equal to the PRU received power, then the PRU is receiving the power signal from the PTU. Such an example cross connection protocol is herein referred to as "power measurement cross connection detection protocol."

In some examples, the PTU transmits power to the PRU for a time set T (e.g., 10 milliseconds (ms), 20 ms, 30, ms, etc.). In such examples, the PRU changes the PRU load for the T duration. The PTU detects the load change and measures the load change duration (e.g., T'). If the measured duration T' corresponds to T, then the PRU is receiving power from the PTU. Such an example cross connection protocol is herein referred to as "time set cross connection detection protocol."

In some examples, the PTU transmits a value X (e.g., a binary value) encoded with a code word Y (e.g., a string). In such examples, Y is modulated on the magnetic field generated by PTU. The PRU receives the modulated signal and decodes to get an estimate of X (e.g., X'). The PRU inserts X' into an advertisement and transmits the advertisement to the PTU. If X is approximately equal to X', then the PRU is receiving the power signal from the PTU. Such an example cross connection protocol is herein referred to as "value set cross connection detection protocol."

Each of the above-described cross connection protocols may be problematic in dense wireless power transmission networks (e.g., where many closely spaced PTUs are present). For example, in dense wireless power transmission networks, two PTUs may use the same time set duration T. In such an example, the two PTUs may incorrectly determine that no cross connection exists because the determined duration T' matches the duration T; however, because both PTUs used the duration T, the PRU could be receiving power from either PTU but not both.

Examples disclosed herein alleviate such incorrect cross connection detection by using centralized and/or distributed assignments. A centralized assignment, as defined herein, is when the transmission gateway assigns different time sets T, for example, to each of the PTUs in the topology to ensure unique time sets for each PTU. A distributed assignment, as defined herein, is when each PTU selects its own time set T, for example, and transmits the time set T to the transmission gateway and receives approval before running the time set protocol. In such examples, the transmission gateway verifies that each time set T is unique and adjust any matching (e.g., duplicate) time sets.

Examples disclosed herein may run cross connection detection by organizing PTUs into groups and running a series of cross connection detections for each group to identify which PTU in a topology has a power connection with a PRU. For example, if there are ten PTUs and only five available time sets. The transmission gateway may group the ten PTUs into two groups of five and distribute the five time sets to each PTU within a group. In such an example, the transmission gateway may instruct the first group to run the time set based cross connection detection protocol first and instruct the second group to run the time set based cross connection detection protocol second. Using examples disclosed herein, the transmission gateway ensures that cross connection detection can occur when time sets (or values V with code words Y) are limited.

Using examples disclosed herein, once a cross connection has been detected, the transmission gateway is used to establish a virtual communication connection (e.g., facilitate communications between a first PTU, a second PTU, and a PRU). For example, the first PTU may establish a communication link with the PRU while the PRU receives a power signal from a power connection with the second PTU. In such an example, the second PTU may transmit a communication signal (e.g., data, a request, a response, a command, etc.) intended for the PRU to the transmission gateway. The transmission gateway determines that the PRU is connected to the first PTU via the communication connection based on the topology and transmits the communication signal to the first PTU to forward to the PRU. Additionally or alternatively, the PRU may transmit a communication signal to the first PTU intended for the second PTU. In such an example, the first PTU transmits the communication signal to the transmission gateway to forward to the second PTU.

FIG. 1 is an example environment 100 illustrating a wireless power transfer network with an example transmission gateway 102 communicating with, via an example gateway link 103, two example PTUs (e.g., charging stations) 104, 106. For example, the example environment 100 may include the example table 107 in a public environment that includes two or more PTUs. Although the example environment includes two PTUs, any number of PTUs may be utilized. The example environment 100 includes the example transmission gateway 102, the example gateway link 103, the first example PTU 104, the second example PTU 106, the example table 107, an example wireless power computing device 108, an example cross connected wireless power computing device 110, example power connections 112, 113, and example communication links 114, 115.

In the example environment 100 of FIG. 1, the example transmission gateway 102 is a networking device that communicates with various computing devices and develops a topology of connected computing devices. Alternatively, the example transmission gateway 102 may be any computing device (e.g., a tablet, a mobile device, a portable computing device, a processor, a gaming system, a server, and/or any computing device). The transmission gateway 102 facilitates cross connection detection and communication between connected PTUs (e.g., the example PTUs 104, 106) via the example gateway link 103. The example gateway link 103 is a wired, or wireless, connection used to communicate data between the example transmission gateway 102 and the example PTUs 104, 106.

The example PTUs 104, 106 are power transmission units. The example PTUs 104, 106 include an antenna and/or a coil to generate electromagnetic waves to communicate with PRUs via the example communication links 114, 115 and/or generate the power signals via the example power connections 112, 113. The power signals are received by PRUs (e.g., embedded in, or otherwise connected to, the example computing devices 108, 110) to power (e.g., charge) the example computing devices 108, 110. The example communication links 114, 115 are used as to communicate with the PRUs. As further described in FIGS. 2 and 5, the example PTUs 104, 106 run cross connection detection protocols, communicate to PRUs via virtual connection links, and communicate with the example transmission gateway 102. For example, PTUs 104, 106 may communicate PTU data and/or PRU data to the example transmission gateway 102. The PTU data may include an identifier of the PTU, a class of the PTU, a power of the PTU, a maximum power of the PTU, a timestamp of the PTU, a status of the PTU (e.g., how many and/or which PRUs are connected to the PTU), a location of the PTU, and/or any data related to the PTU. The PRU data may include an identifier of the PRU, a device type of the PRU, cross connection status of the PRU, a timestamp of the PRU, a class of the PRU, a power of the PRU, a status of the PRU, a location of the PRU, and/or any data related to the PRU.

The example computing devices 108, 110 include PRUs capable of receiving wireless power via the example power connections 112, 113 from the example PTUs 104, 106 to charge a battery of the computing devices 108, 110. In the example illustration 100, the example computing devices 108, 110 are mobile devices. Alternatively, the example computing devices 108, 110 may be computers, laptops, tablets, media players, portable gaming devices, digital media recorders, and/or any other type of computing device with a PRU embedded in, or otherwise connected to, the computing device. As previously described, when any one of the example computing devices 108, 110 enters within a threshold range of either one of the example PTUs 104, 106, the computing device 108, 110 receives power and/or communicates with at least one of the example PTUs 104, 106. Although the example environment 100 includes two computing devices, any number of computing devices may be powered by any one of the example PTUs 104, 106.

The example power connections 112, 113 include an electromagnetic wave output by the example PTUs 104, 106. The example power connections 112, 113 provide power to the example computing devices 108, 110. The example communication links 114, 115 are a wireless link to wireless exchange data between the example PTUs 104, 106 and the example computing devices 108, 110. The example communication links 114, 115 may be a Bluetooth low energy (BLE) link, a Wi-Fi link, a near field communication link, a wireless universal serial bus link, a radio frequency identification link, and/or any other type of wireless link.

In operation, the example PTUs 104, 106 transmit PTU data to the example transmission gateway 102 via the gateway link 103 when initially powered up. Additionally or alternatively, the example PTUs 104,106 may transmit PTU data at any point in time. In response to receiving the PTU data, the example transmission gateway 102 generates a topology mapping of connected PTUs (e.g., the example PTUs 104, 106). If additional PTUs power up and/or connect to the example transmission gateway 102 at a later time, the transmission gateway 102 may add the additional PTUs to the topology mapping. Additionally, the example transmission gateway 102 may instruct any one of the connected PTU 104, 106 to transmit updated PTU data at any period of time.

When a PTU (e.g., the first example PTU 104) connects to the transmission gateway 102 and establishes the example communication link 114 with the example computing device 110, the first example PTU 104 transmits data associated with the PRU (e.g., PRU data) to the example transmission gateway 102 via the example gateway link 103. In some examples, the first PTU 104 runs an initial cross connection detection protocol prior to transmitting PRU data to the example transmission gateway 102. In such examples, the first PTU 104 may transmit additional data associated with whether or not there is a cross connection for the example computing device 110.

The example transmission gateway 102 receives the PRU data and/or the cross connection data via the gateway link 103 and adds the PRU to the topology mapping based on the PRU data and/or the cross connection data. In some examples, when the cross connection data identifies that there is not a cross connection, the example transmission gateway 102 corresponds the PTU with the PRU. In some examples, when there is a cross connection or when the first example PTU 104 did not run an initial cross connection detection protocol, the example transmission organizes a cross connection detection. For example, the transmission gateway 102 may send instructions to the first example PTU 104 and the second example PTU 106 to run a cross connection detection protocol for a newly connected computing device (e.g., the example computing device 110).

Once the cross connection detection protocol is run, the transmission gateway 102 may identify (A) whether a cross detection exits and (B) if it does, which PTU established the example communication link 114 with the example computing device 110 and which PTU is powering the computing device 110 via the power connection 112. The transmission gateway 102 adds any cross connection data to the topology mapping. For example, in the example illustration 100, the topology mapping generated by the example transmission gateway 102 may establish that the first example PTU 104 has (A) the power connection 113 and the communication link 115 (e.g., non-cross connection) with the example computing device 108 and (B) the communication link 114, but not the power connection 112, with a PRU of the example computing device 110. The topology mapping may further establish that the second example PTU 106 has the power connection 112 to the PRU of the example computing device 110. Thus, the topology mapping establishes that the example computing device 110 is cross connected between the first example PTU 104 and the second example PTU 106. The topology mapping may further include PTU data and PRU data corresponding to the first example PTU 104, the second example PTU 106, the first example computing device 108, and/or the second example computing device 110.

Figure 3:
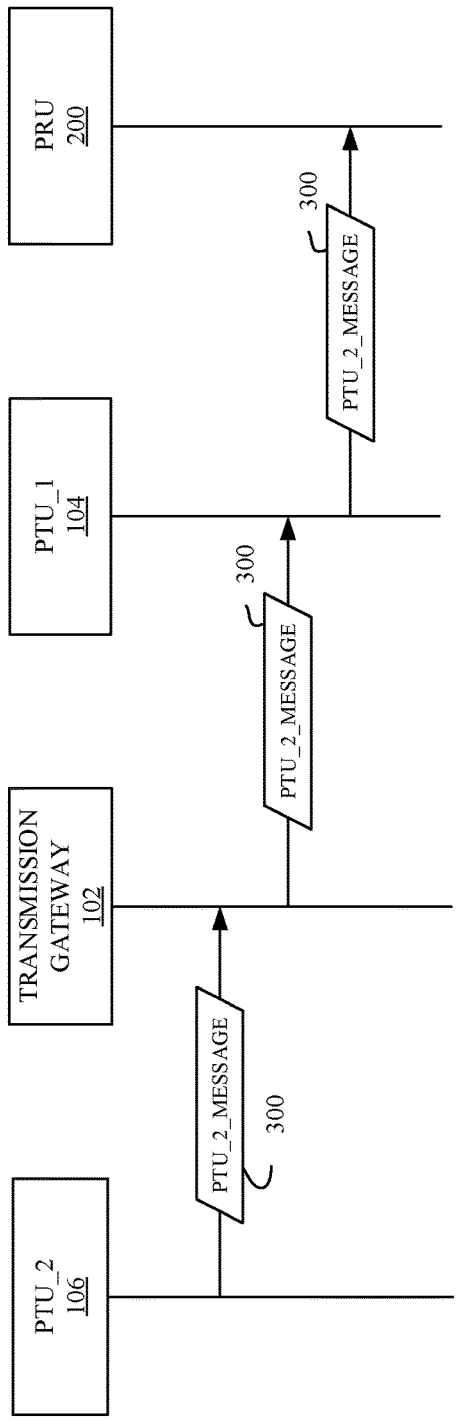
FIGS. 3 and 4 are diagrams representative of an example virtual communication connection for cross connection mitigation.
Figure 4:
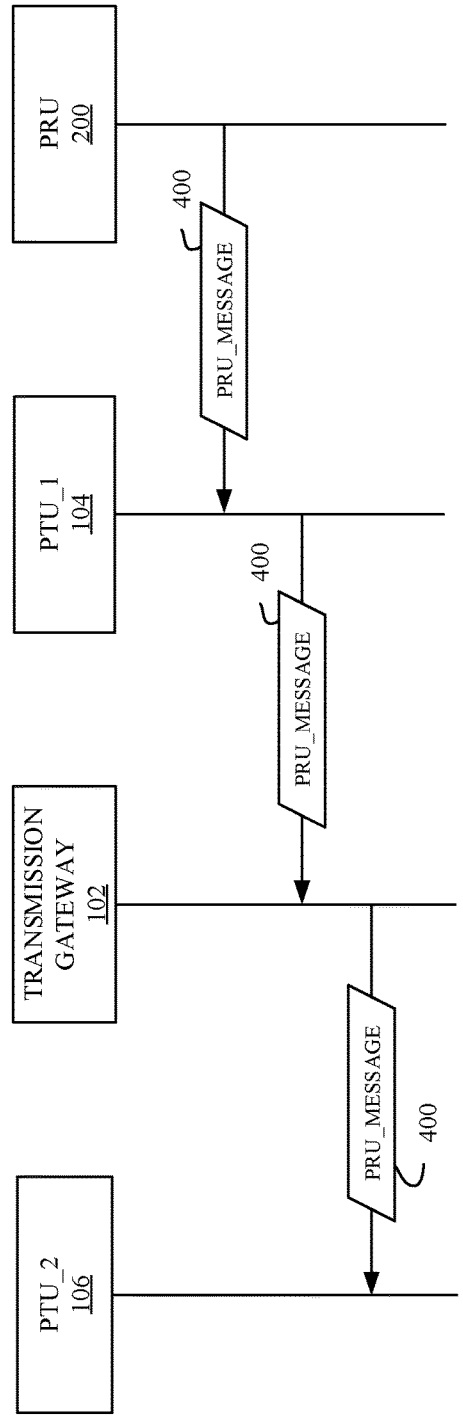

As further described in FIGS. 3 and 4, once a cross connection exists in a topology, the example transmission gateway 102 organizes a virtual connection link with the first example PTU 104 and the second example PTU 106. In the illustrated example 100, the virtual connection link allows the second example PTU 106 to communicate with the cross connected computing device 110 via the transmission gateway 102 and the communication link 114 of the second example PTU 106. Additionally, the example computing device 110 can communicate with the example second PTU 106 via the transmission gateway 102.

Figure 2:
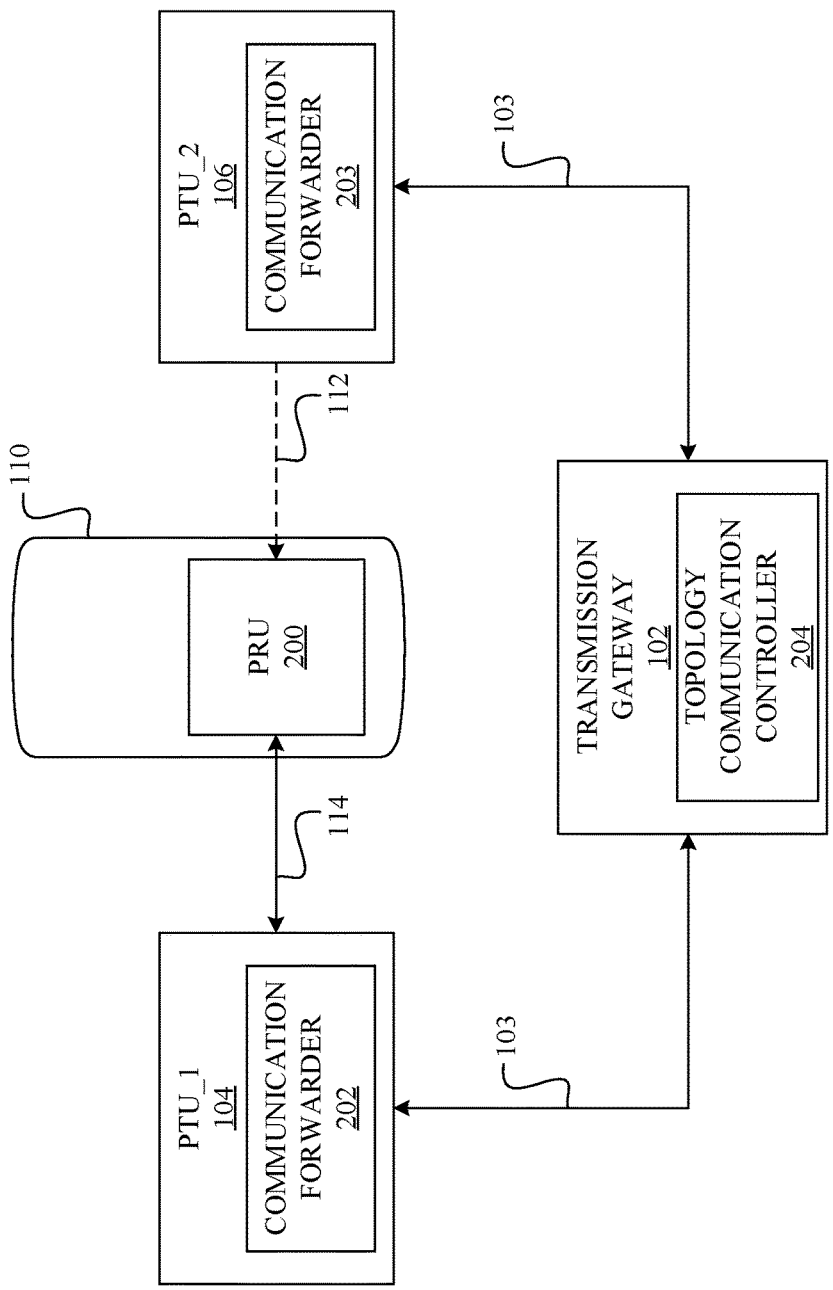
FIG. 2 is an example illustration of a virtual connection for a cross connected computing device in a wireless power transfer network.

FIG. 2 is an illustration of the example cross connected computing device 110 of FIG. 1. FIG. 2 includes the example transmission gateway 102, the example gateway link 103, the first example PTU 104, the second example PTU 106, the example computing device 110, the example power connection 112, and the example communication link 114 of FIG. 1. The example computing device 110 includes an example PRU 200, the example PTUs 104, 106 include example communication forwarders 202, 203, and the example transmission gateway 102 includes an example topology communication controller 204.

The example PRU 200 is an electrical circuit embedded in, or otherwise connected to, the example computing device 110. The example PRU 200 receives the example communication link 114 from the first example PTU 104 and/or the example power connection 112 from the second example PTU 106. The example PRU 200 may include an antenna and/or coil to receive a power signal via the power connection 112. Additionally, the example PRU 200 transmits data to the first example PTU 104 via the communication link 114. The transmitted data may include instructions, requests, responses, commands, etc. intended for the second example PTU 106 and/or PRU data.

The example communication forwarders 202, 203 establish connection links and/or power links with the example PRU 200 of the example computing device 110. Additionally, the example communication forwarders 202, 203 may communicate PTU data, PRU data, cross connection data, and/or any communication data to the example transmission gateway 102. In some examples, the first example PTU 104 may determine whether or not the computing device 110 is cross connected by utilizing a cross connection detection protocol. In some examples, the communication forwarders 202,203 run the cross connection detection protocol when the communication link 114 is initially established. In some examples, the communication forwarders 202, 203 run the cross connection detection protocol based on instructions from the example transmission gateway 102. When a cross connection exists, the example communication forwarders 202, 203 may forward communication data intended for the example PRU 200 to the example transmission gateway 102. Alternatively, when a cross connection exists, the example communication forwarders 202, 203 may forward communication data intended for a PTU to the example transmission gateway 102. An example of the forwarding of the communication is further described in FIGS. 3 and 4.

The example topology communication controller 204 generates and manages a topology of PTU devices in a network. In some examples, the topology communication controller 204 updates the topology mapping when additional PTUs and/or PRUs enter the topology. In some examples, the topology communication controller 204 organizes cross connection detection protocols to establish if and how the example computing device 110 is cross connected. Additionally, the example topology communication controller 204 may receive communication data from any one of the first example PTU 104 or the second example PTU 106 via the gateway link 103. The communication data may be from or intended for the example PRU 200 of the computing device 110. The example topology communication controller 204 processes the incoming communication data and forwards the communication data to the intended destination based on the generated topology mapping via the gateway link 103, as further described in FIGS. 3 and 4.

FIG. 3 is an example timing diagram of a virtual connection link used to mitigate the cross connection of the example PRU 200 of FIG. 2 by facilitating a virtual connection link. The example timing diagram includes the example transmission gateway 102, the first example PTU 104, the second example PTU 106, and the example PRU 200 of FIG. 2. The example timing diagram further includes an example PTU_2_message 300. In the illustrated timing diagram, the cross connected PRU 200 has a connection link (e.g. the example communication link 114 of FIG. 2) with the first example PTU 104 and a power connection (e.g., the example power connection 112 of FIG. 2) with the second PTU 106.

Because the second example PTU 106 is providing power to the example PRU 200, the second example PTU 106 may need to communicate data to the second example PRU 106. However, the example PRU 200 has a connection link with the first example PTU 104. Thus, the second example PTU 106 transmits the example PTU_2_message 300 to the example transmission gateway 102 to forward a PTU with the communication link 114 with the PRU 200. The example PTU_2_message 300 may be status data, power data, a request, a response, and/or a command.

The example transmission gateway 102 processes the example PTU_2_message 300 to determine which PTU (e.g., the first example PTU 104) corresponds to the example PRU 200 based on the PTU_2_message 300. The example transmission gateway 102 determines which PTU corresponds to the PRU based on the topology mapping. For example, the transmission gateway 102 determines that the example PRU 200 includes a connection link (e.g., the example communication link 114 of FIG. 2) with the first example PTU 104. The transmission gateway 102 forwards the example PTU_2_message 300 to the first example PTU 104.

The first example PTU 104 processes the received PRU_2_message 300 to determine a destination PRU. In some examples, the first example PTU 104 may establish connection links with multiple PRUs. In such an example, the first example PTU 104 determines that the example PTU_2_message 300 is associated with the example PRU 200. The first example PTU 104 transmits the example PTU_2_message 300 to the example PRU 200.

FIG. 4 is an example timing diagram of a virtual connection link used to mitigate the cross connection of the example PRU 200 of FIG. 2 by facilitating a virtual connection link. The example timing diagram includes the example transmission gateway 102, the first example PTU 104, the second example PTU 106, and the example PRU 200 of FIG. 2. The example timing diagram further includes an example PRU_message 400. In the illustrated timing diagram, the cross connected PRU 200 has a connection link (e.g. the example communication link 114 of FIG. 2) with the first example PTU 104 and a power connection (e.g., the example power connection 112 of FIG. 2) with the second PTU 106.

Because the second example PTU 106 is providing power to the example PRU 200, the example PRU 200 may need to communicate data to the second example PTU 106. However, the example communication link 114 connects the example PRU 200 with the first example PTU 104. Thus, the example PRU_message 400 from the example PRU 200 is received by the first example PTU 104 and later forwarded to the intended PTU (e.g., the second example PTU 106) via the example transmission gateway 102. The example PRU_message 400 may be statues data, power data, a request, a response, and/or a command. The first example PTU 104 transmits the example PRU_message_400 to the example transmission gateway 102 because (A) the first example PTU 104 identified that the example PRU 200 is cross connection and/or (B) the first example PTU 104 determines that the example PRU_message 400 corresponds to a different PTU based on data of the example PRU_message 400.

The example transmission gateway 102 processes the example PRU_message 400 to determine a PTU associated with the PRU_message 400. The example transmission gateway 102 determines which PTU corresponds to the PRU based on the topology mapping. For example, the transmission gateway 102 determines that the example PRU 200 includes a virtual connection link with the second example PTU 106. The transmission gateway 102 forwards the example PRU_message 400 to the second example PTU 106.

Figure 5:
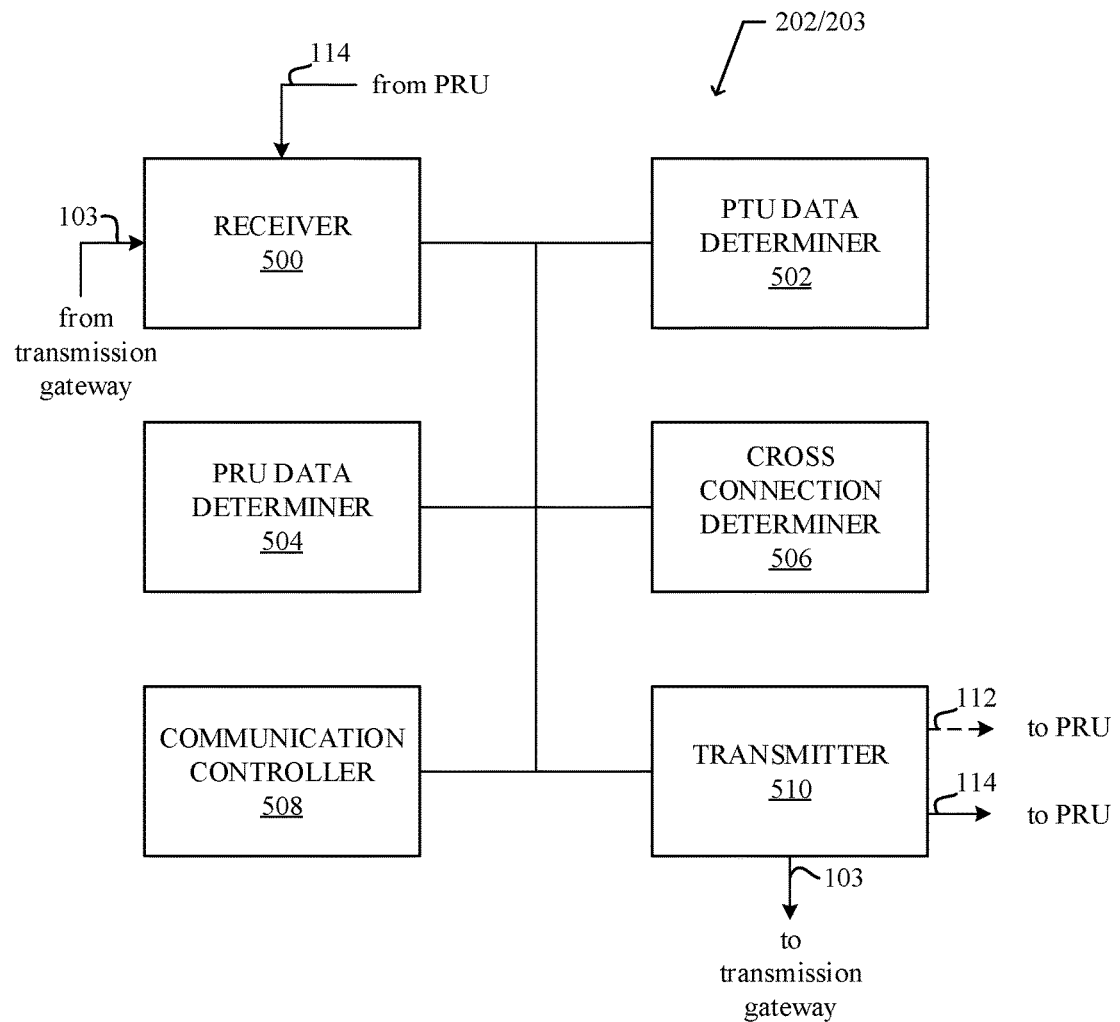
FIG. 5 is a block diagram of an example of the communication forwarder of FIG. 2.

FIG. 5 is a block diagram of an example implementation of the example communication forwarder 202 and/or the example communication forwarder 203 of FIG. 2, disclosed herein, to generate PTU data, generate PRU data, run cross connection detection protocols, and communicate via a virtual connection link. While the example communication forwarder 202, 203 of FIG. 5 is described in conjunction with the example PTUs 104, 106 of FIGS. 1 and 2, the example communication forwarder 202, 203 may be utilized in any wireless power transfer device. The example communication forwarder 202, 203 includes an example receiver 500, an example PTU data determiner 502, an example PRU data determiner 504, an example cross connection determiner 506, an example communication controller 508, and an example transmitter 510. The example communication forwarder 202, 203 communicates with a connected PRU via the example communication link 114, transmits power to a connected PRU via the example power connection 112, and communicates with the example transmission gateway 102 via the example gateway link 103.

The example receiver 500 receives instructions and/or virtual connection communication data from the example transmission gateway 102 via the example gateway link 103 and receives communication data from the example PRU 200 via the example communication link 114. As described above, the instructions may include instructions associated with a cross connection detection protocol and/or instructions to transmit PTU data and/or PRU data. The virtual connection communication data may include a message from a cross connected PRU and/or forwarding instructions associated with a cross connected PRU.

The example PTU data determiner 502 generates data corresponding to the PTU (e.g., PTU data). For example, the PTU data determiner 502 may identify an identifier for the PTU, a class of the PTU, a maximum power of the PTU, a timestamp associated with a power-up time of the PTU, a number and/or identity of PRUs associated with the PTU, etc. As described above, the class of the PTU is associated with which types of devices (e.g., mobile devices, tablets, laptops, etc.) the PTU can power. In some examples, a lower class is associated with low power devices with small loads and a higher class is associated with high power devices with large loads. Additionally, the PTU data determiner 502 may monitor a status of the PTU and generate new PTU data when the status of the PTU changes.

The example PRU data determiner 504 processes data (e.g., PRU data) received from a connected PRU (e.g., the example PRU 200 of FIG. 2). For example, when the first example PTU 104 of FIG. 2 establishes the communication link 114 with the example PRU 200, the PRU data determiner 504 determines PRU data associated with the example PRU 200 based on the data received from the connected PRU. The data may include an identifier of the PRU, a device type of the PRU, cross connection status of the PRU, a timestamp associated with when the PRU connected with the first example PTU 104, a class of device connected to the PRU, a power of the PRU, a load associated with the PRU, a status of the PRU, a location of the PRU, and/or any data related to the PRU. Additionally, the PRU data determiner 504 may include cross connection data in the PRU data when a cross connection detection protocol has been executed.

The example cross connection determiner 506 executes cross connection detection protocols to determine if the example PRU 200 is cross connected with another PTU. In some examples, the cross connection determiner 506 may execute a cross connection protection protocol after the example communication link 114 is established. In some examples, the cross connection determiner 506 may execute a cross connection protection protocol after receiving instructions from the example transmission gateway 102 via the example gateway link 103. As described above, the cross connection detection protocol may be a voltage measurement cross connection detection protocol, a power measurement cross connection detection protocol, a time set cross connection detection protocol, a value set cross connection detection protocol, and/or any other type of cross connection detection protocol. In some examples, the cross connection determiner 506 may select a cross connection detection protocol. In some examples, the cross connection determiner 506 receives a cross connection detection protocol from the example transmission gateway 102. Additionally, when the cross connection detection is a time set or value set cross connection detection protocol, the example cross connection determiner 506 may randomly select a time set or value set. Alternatively, the example cross connection determiner 506 may receive the time set or value set from the example transmission gateway 102.

The example communication controller 508 analyzes communication data from the example PRU 200 and/or the example transmission gateway 102 to help facilitate a virtual connection link in a PTU/PRU topology (e.g., such as the example environment 100 of FIG. 1). In some examples, the communication controller 508 may determine which PRU was the communication data is intended for (e.g., the example PRU 200). In such examples, the communication controller 508 forwards the communication data to the example PRU 200. Alternatively, the communication data may be from the example PRU 200 (e.g., a cross connected PRU) but intended for a different PTU. In such an example, the communication controller 508 forwards the communication data to the example transmission gateway 102 and the example transmission gateway 102 forwards the data to the intended PTU.

The example transmitter 502 transmits PTU data, PRU data, cross connection data and/or communication data to the example transmission gateway 102 via the transmission gateway link 103. Additionally, the example transmitter 502 provides power to a PRU via the example power connection 112 and transmits communication data (e.g., requests, responses, commands, etc.) to a PRU via the example communication link 114.

Figure 6:
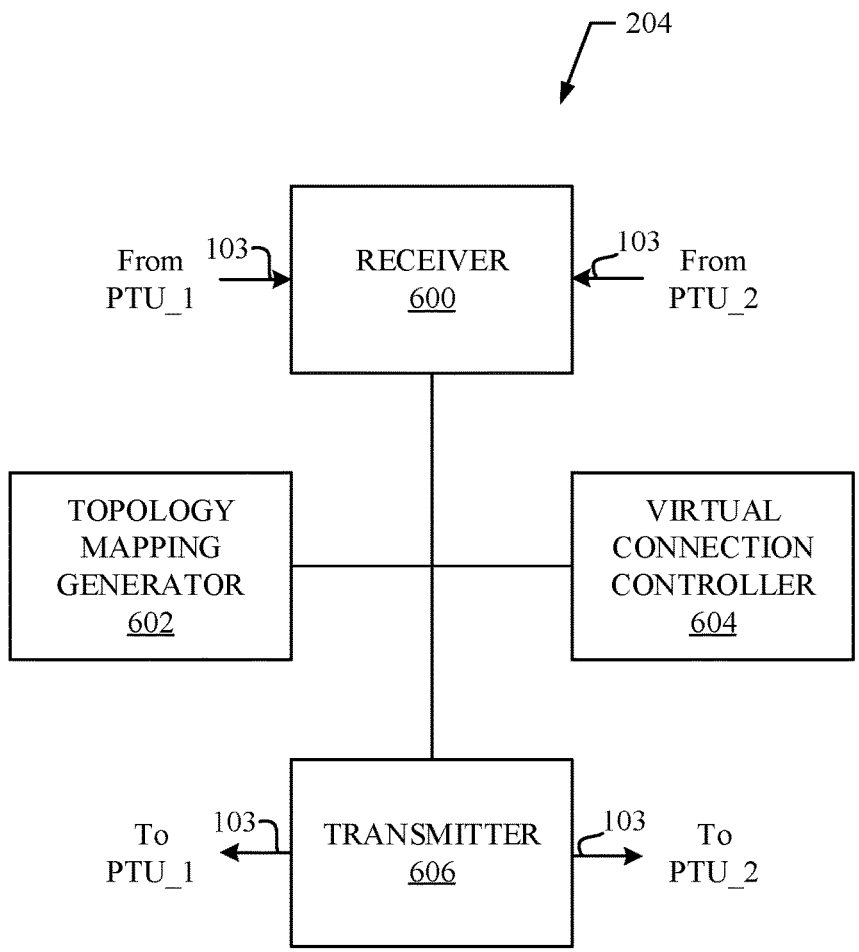
FIG. 6 is a block diagram of an example of the topology communication controller of FIG. 2.

FIG. 6 is a block diagram of an example implementation of the example topology communication controller 204 of FIG. 2, disclosed herein, to generate a topology mapping of PTUs and PRUs and mitigate cross connected PTUs in the topology. While the example topology communication controller 204 of FIG. 6 is described in conjunction with the example PTUs 104, 106 of FIGS. 1 and 2, the example topology communication controller 204 may be utilized in any wireless power transfer device. The example topology communication controller 204 includes an example receiver 600, an example topology mapping generator 602, an example virtual connection controller 604, and an example transmitter 606. The example topology communication controller 204 communicates with a topology of PTUs via the transmission gateway link 103.

The example receiver 600 receives PTU data, PRU data, cross connection data, and/or communication data from the example PTUs 104, 106 via the gateway link 103. The example topology mapping generator 602 generates a PTU/PRU topology mapping based on the received PTU data, PRU data, and/or cross connection data. For example, when a PTU (e.g., the first example PTU 104) powers up, the first PTU 104 transmits PTU data to the topology communication controller 204. The example topology mapping generator 602 processes the PTU data to add the first example PTU 104 to a PTU/PRU topology mapping based on the PTU data. If data related to the first example PTU 104 is updated and/or changed, the first example PTU 104 may send status updates to the example topology communication controller 204 and the example topology mapping generator 602 may update the PTU/PRU topology mapping accordingly. As described above, when a PTU (e.g., the first example PTU 104) establishes the example communication link 114 with the example PRU 200, the first example PTU 104 transmits PRU data associated with the example PRU 200 to the example topology communication controller 204. The example topology mapping generator 602 processes the PRU data to add the example PRU 200 to the PTU/PRU topology mapping. In some examples, the topology mapping generator 602 determines whether a cross connection detection protocol has been and/or needs to be run based on the PRU data. If the example PRU 200 is not cross connected, the example topology mapping generator 602 associates the PRU 200 with the first example PTU 104. If the example PRU 200 is cross connected, the example topology mapping generator 602 associates PTUs associated with the cross connection (e.g., the first example PTU 104 and the second example PTU 106). For example, the topology mapping generator 602 may add the PRU 200 to the PTU/PRU topology mapping noting that the example PRU 200 has the example power connection 112 with the second example PTU 106 and the example communication link 114 with the first example PTU 104.

The example virtual connection controller 604 generates cross connection detection protocols for PTUs in the PTU/PRU topology mapping. In some examples, when PRU data is received by the example receiver 600, the example virtual connection controller 604 transmits instructions run a cross connection detection protocol for some or all of the PTUs in the topology. The example virtual connection controller 604 may run a voltage measurement cross connection detection protocol, a power measurement cross connection detection protocol, a time set cross connection detection protocol, a value set cross connection detection protocol, and/or any other type of cross connection protocol. In some examples, the virtual connection controller 604 may transmit all of the parameters of the cross connection protocol (e.g., a centralized assignment). For example, when the cross connection detection protocol is a time set protocol, the example virtual connection controller 604 may select a different time set for each PTU in the topology. In such an example, the each PTU will run a time set cross connection detection protocol based on the selected time set. Alternatively, the virtual connection controller 604 may only transmit instructions to run a cross connection detection protocol without the parameters (e.g., a distributed assignment). For example, when the virtual connection controller 604 runs a distributed assignment for a time set cross connection detection, each PTU selects a time set and transmits the time set to the example topology communication controller 204. In such an example, the example virtual connection controller 604 verifies that none of the time sets repeat. If time sets repeat, the example virtual connection controller 604 adjusts at least one of the repeated time sets so that each PTU has a unique time set.

Additionally, the example virtual connection controller 604 facilitates a virtual connection link for a cross connected PRU (e.g., the example PRU 200 of FIG. 2). For example, when the example receiver 600 receives communication intended for the example PRU 200. The example virtual connection controller 604 determines which PTU corresponds to the example communication link 114 with the example PRU 200 based on the topology mapping generated by the example topology mapping generator 602. In such an example, the example virtual connection controller 604 determines that the PRU 200 has the communication link 114 with the first example PTU 104. Thus, the example virtual connection controller 604 instructs the example transmitter 606 to transmit the communication data to the first example PTU 104 via the example gateway link 103. When the example receiver 600 receives communication data intended for a PTU (e.g., the second example PTU 106), the example virtual connection controller 604 forwards the communication data to the second example PTU 106.

While example manners of implementing the example communication forwarder 202, 203 of FIG. 2 is illustrated in the FIG. 5 and the example topology communication controller 204 of FIG. 2 is illustrated in FIG. 6, elements, processes and/or devices illustrated in FIGS. 5 and 6 may be combined, divided, re-arranged, omitted, eliminated and/or implemented in any other way. Further, the example receiver 500, the example PTU data determiner 502, the example PRU data determiner 504, the example cross connection determiner 506, the example communication controller 508, the example transmitter 510, and/or, more generally, the example communication forwarder 202, 203 of FIG. 5, and/or the example receiver 600, the example topology mapping generator 602, the example virtual connection controller 604, the example transmitter 606, and/or more generally, the example topology communication controller 204 of FIG. 6 may be implemented by hardware, machine readable instructions, software, firmware and/or any combination of hardware, machine readable instructions, software and/or firmware. Thus, for example, any of the example receiver 500, the example PTU data determiner 502, the example PRU data determiner 504, the example cross connection determiner 506, the example communication controller 508, the example transmitter 510, and/or, more generally, the example communication forwarder 202, 203 of FIG. 5, and/or the example receiver 600, the example topology mapping generator 602, the example virtual connection controller 604, the example transmitter 606, and/or more generally, the example topology communication controller 204 of FIG. 6, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 500, the example PTU data determiner 502, the example PRU data determiner 504, the example cross connection determiner 506, the example communication controller 508, the example transmitter 510, and/or, more generally, the example communication forwarder 202, 203 of FIG. 5, and/or the example receiver 600, the example topology mapping generator 602, the example virtual connection controller 604, the example transmitter 606, and/or more generally, the example topology communication controller 204 of FIG. 6, is/are hereby expressly defined to include a tangible computer readable storage device or storage disk such as a memory, a digital versatile disk (DVD), a compact disk (CD), a Blu-ray disk, etc. storing the software and/or firmware. Further still, the example communication forwarder 202, 203 of FIG. 5 and/or the example topology communication controller 204 of FIG. 6 includes elements, processes and/or devices in addition to, or instead of, those illustrated in FIGS. 7-14, and/or may include more than one of any or all of the illustrated elements, processes and devices.

Figure 7:
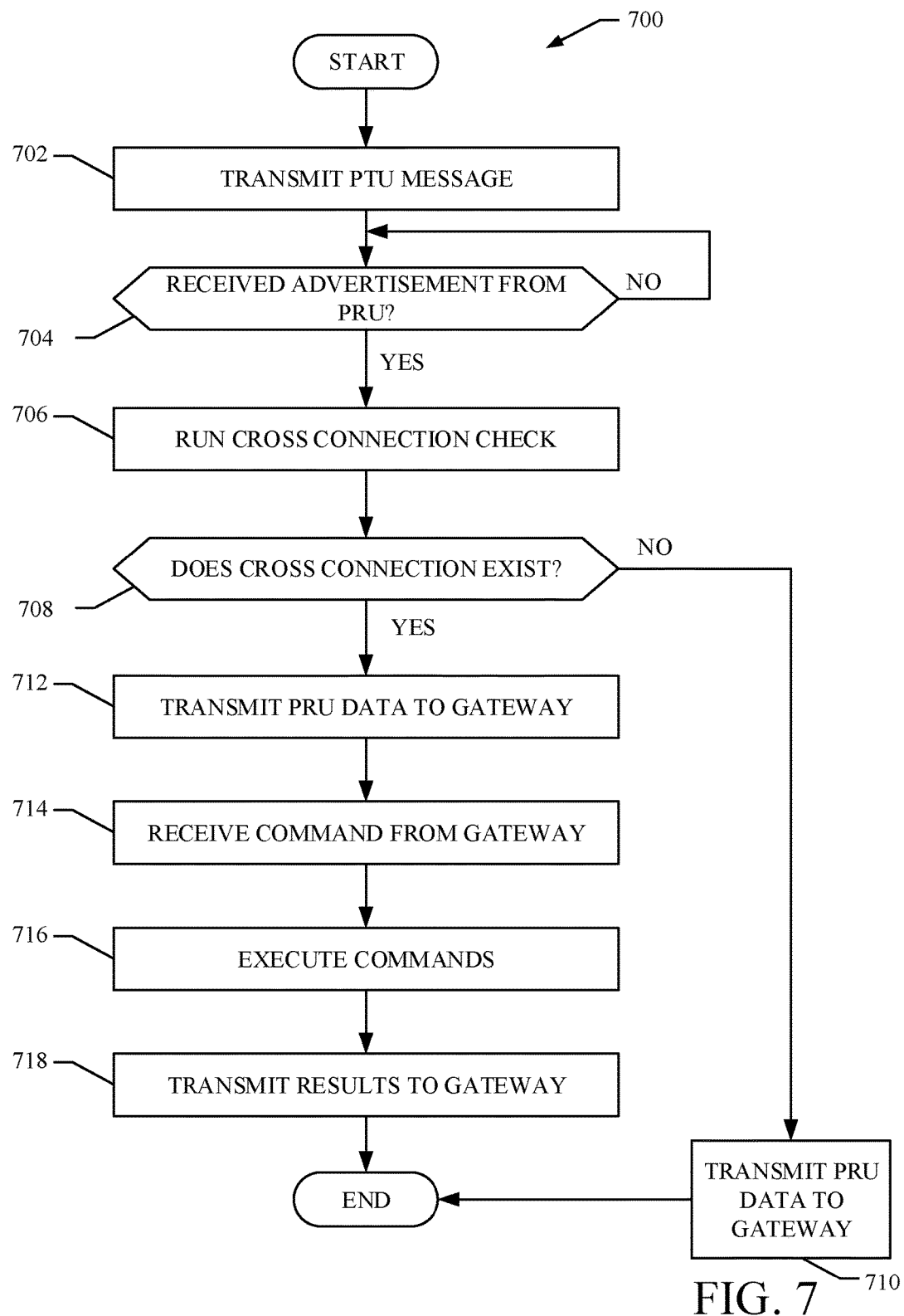
FIGS. 7-9 are flowcharts representative of example machine readable instructions that may be executed to implement the example communication forwarder of FIG. 5.
Figure 8:
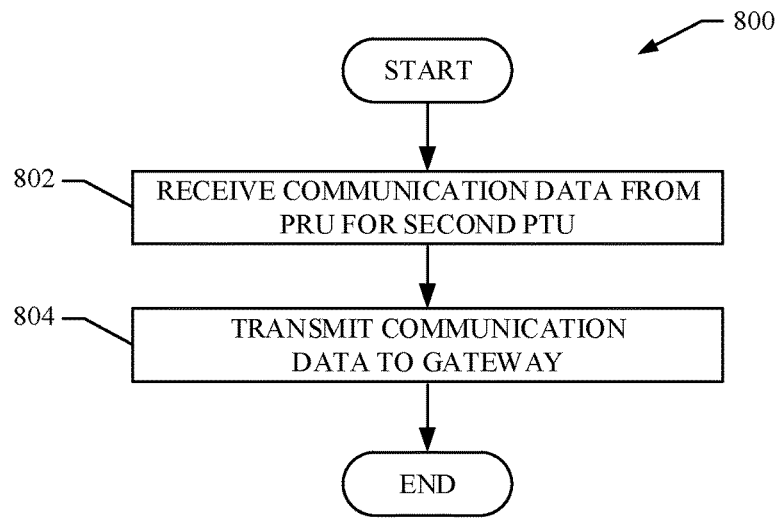
Figure 9:
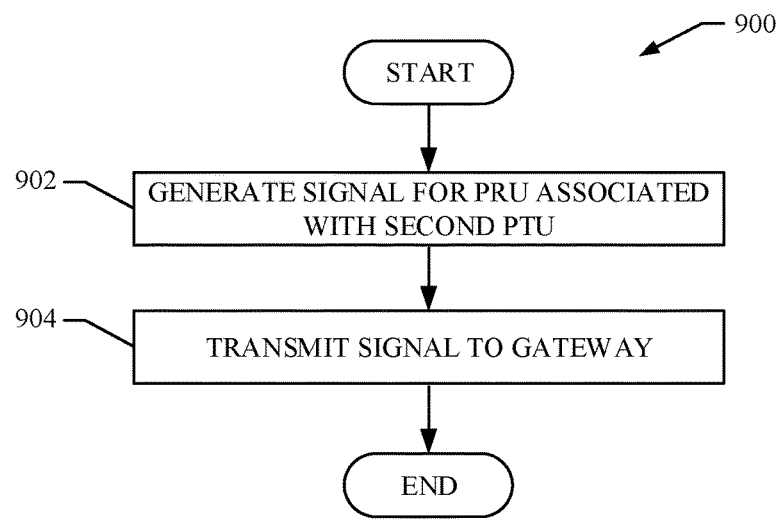

A flowchart representative of example machine readable instructions for implementing the example communication forwarder 202, 203 of FIG. 5 is shown in FIGS. 7-9 and the example topology communication controller 204 of FIG. 6 is shown in FIGS. 10-14. In the examples, the machine readable instructions comprise a program for execution by a processor such as the processors 1512, 1612 shown in the example processor platforms 1500, 1600 discussed below in connection with FIGS. 15 and 16. The program may be embodied in machine readable instructions stored on a tangible computer readable storage medium such as a CD-ROM, a floppy disk, a hard drive, a digital versatile disk (DVD), a Blu-ray disk, or a memory associated with the processors 1512, 1612, but the entire program and/or parts thereof could alternatively be executed by a device other than the processors 1512, 1612 and/or embodied in firmware or dedicated hardware. Further, although the example program is described with reference to the flowcharts illustrated in FIGS. 7-14, many other methods of implementing the example communication forwarder 202, 203 of FIG. 5 and/or the example topology communication controller 204 of FIG. 6 may alternatively be used. For example, the order of execution of the blocks may be changed, and/or some of the blocks described may be changed, eliminated, or combined.

As mentioned above, the example processes of FIGS. 7-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is an example flowchart 700 representative of example machine readable instructions that may be executed by the example communication forwarder 202, 203 of FIG. 5 to transmit PRU data and/or PTU data to the example transmission gateway 102 for generation of a PTU/PRU topology mapping in a network.

At block 702, the example transmitter 510 transmits PTU data to the example transmission gateway 102 via the transmission gateway link 103. As described above, the example PTU data is generated by the example PTU data determiner 502. The PTU data includes an identifier of the PTU, a class of the PTU, a power of the PTU, a maximum power of the PTU, a timestamp of the PTU, a status of the PTU (e.g., how many and/or which PRUs are connected to the PTU), a location of the PTU, and/or any data related to the PTU. The transmitter 510 may transmit PTU data to the example transmission gateway 102 when the example communication forwarder 202, 203 powers up, at set time intervals, and/or based on instructions from the example transmission gateway 102.

At block 704, the example receiver 500 determines if an advertisement have been received from a PRU (e.g., the example PRU 200 of FIG. 2). As described above, the example PRU 200 transmits an advertisement to establish the example communication link 114 with a PTU. If the example receiver 500 has not received an advertisement, the example receiver 500 continues to search for an advertisement. If the receiver 500 receives an advertisement from the example PRU 200, then the example cross connection determiner 506 runs a cross connection detection protocol (block 706). In some examples, the example communication forwarder 202, 203 does not run a cross connection detection protocol without instructions from the example transmission gateway. As described above, the cross connection detection protocol may be any one of a voltage measurement cross connection detection protocol, a power measurement cross connection detection protocol, a time set cross connection detection protocol, a value set cross connection detection protocol, and/or any other type of cross connection detection protocol.

At block 708, the cross connection determiner 506 determines if a cross connection exists based on cross connection detection protocol. If a cross connection does not exist (e.g., the PTU includes the communication link 114 and the power connection 112 with the PRU), the example transmitter 510 transmits the PRU data to the example transmission gateway 102 (block 710). The PRU data is processed by the PRU data determiner 504 and may include at least one of an identifier of the PRU, a device type of the PRU, cross connection status of the PRU, a timestamp of the PRU, a class of the PRU, a power of the PRU, a status of the PRU, a location of the PRU, and/or any data related to the PRU. The PRU data may include data identifying that the PRU is not cross connected with another PTU. If a cross connection does exist, the example transmitter transmits PTU data to the transmission gateway 102 (block 712). The PTU data may include data identifying that the PRU is cross connected with another PTU.

At block 714, the example receiver 500 receives a command from the example transmission gateway 102. The command includes instructions associated with a cross connection detection protocol. As described above, the example transmission gateway 102 may identify which PTU is associated with the communication link 114 and which PTU is associated with the power connection 112 for a cross connected PRU. In some examples, the example transmission gateway 102 will include parameters for the example cross connection detection protocol. For example, the parameters may include which cross connection detection protocol to run, as well as how to run the cross connection detection protocol (e.g., which voltage, power, time set, value set, etc. to use). Alternatively, the parameters may allow the example cross connection determiner 506 to select some or all of the parameters. In such examples, the transmitter 510 may transmit the parameters to the transmission gateway prior to running the cross connection detection protocol to make sure that parameters are not repeated.

At block 716, the example cross connection determiner 506 executes the received commands. At block 718, the example transmitter 510 transmits results associated with the executed commands to the example transmission gateway 102. The results identify whether the PTU has the example power connection 112 with the example PRU 200. The example transmission gateway 102 processes the results to develop the PTU/PRU topology mapping.

FIG. 8 is an example flowchart 800 representative of example machine readable instructions that may be executed by the example communication forwarder 202, 203 facilitate a virtual connection link to forward communication data from the example PRU 200 to the second example PTU 106 via the example transmission gateway 102.

At block 802, the example receiver 500 of the first example PTU 104 receives communication data from intended for the second example PTU 106. As described in FIG. 4, the example communication link 114 is established with the first example PTU 104 and the power connection 112 is established with the second example PTU 106. Thus, communication data from the example PRU 200 intended for the second example PTU 106 cannot be transmitted directly to the second example PTU 106. In some examples, the example communication controller 508 determines that the PRU 200 is cross connected (e.g., based on a prior cross connection detection). At block 804, the example communication controller 508 instructs the example transmitter 510 to transmit the communication data to the example transmission gateway 102. As further described in FIG. 13, the example transmission gateway 102 identifies the corresponding PTU (e.g., the second example PTU 106) and forwards the communication data to the corresponding PTU.

FIG. 9 is an example flowchart 900 representative of example machine readable instructions that may be executed by the example communication forwarder 202, 203 of FIG. 5 facilitate a virtual connection link to communicate with the example PRU 200 via the example transmission gateway 102 and the first example PTU 104.

At block 902, the example communication controller 508 of the second example PTU 106 generates a signal (e.g., communication data) intended for the example cross connected PRU 200. As described in FIG. 3, the example communication link 114 is established with the first example PTU 104 and the power connection 112 is established with the second example PTU 106. Thus, communication data from the second example PTU 106 intended for the example PRU 200 cannot be transmitted directly to the example PRU 200. In some examples, the communication controller 508 determines that the PRU 200 is cross connected (e.g., based on a prior cross connection detection). At block 904, the example communication controller 508 instructs the example transmitter 510 to transmit the generated signal to the example gateway 102. As further described in FIG. 14, the example transmission gateway 102 identifies the PTU (e.g., the first example PTU 104) corresponding to the example communication link 114 with the PRU 200 and forwards the signal to the corresponding PTU. The communication controller 508 of the corresponding PTU determines that the signal is intended for the example PRU 200 and forwards the signal to the example PRU 200.

Figure 10:
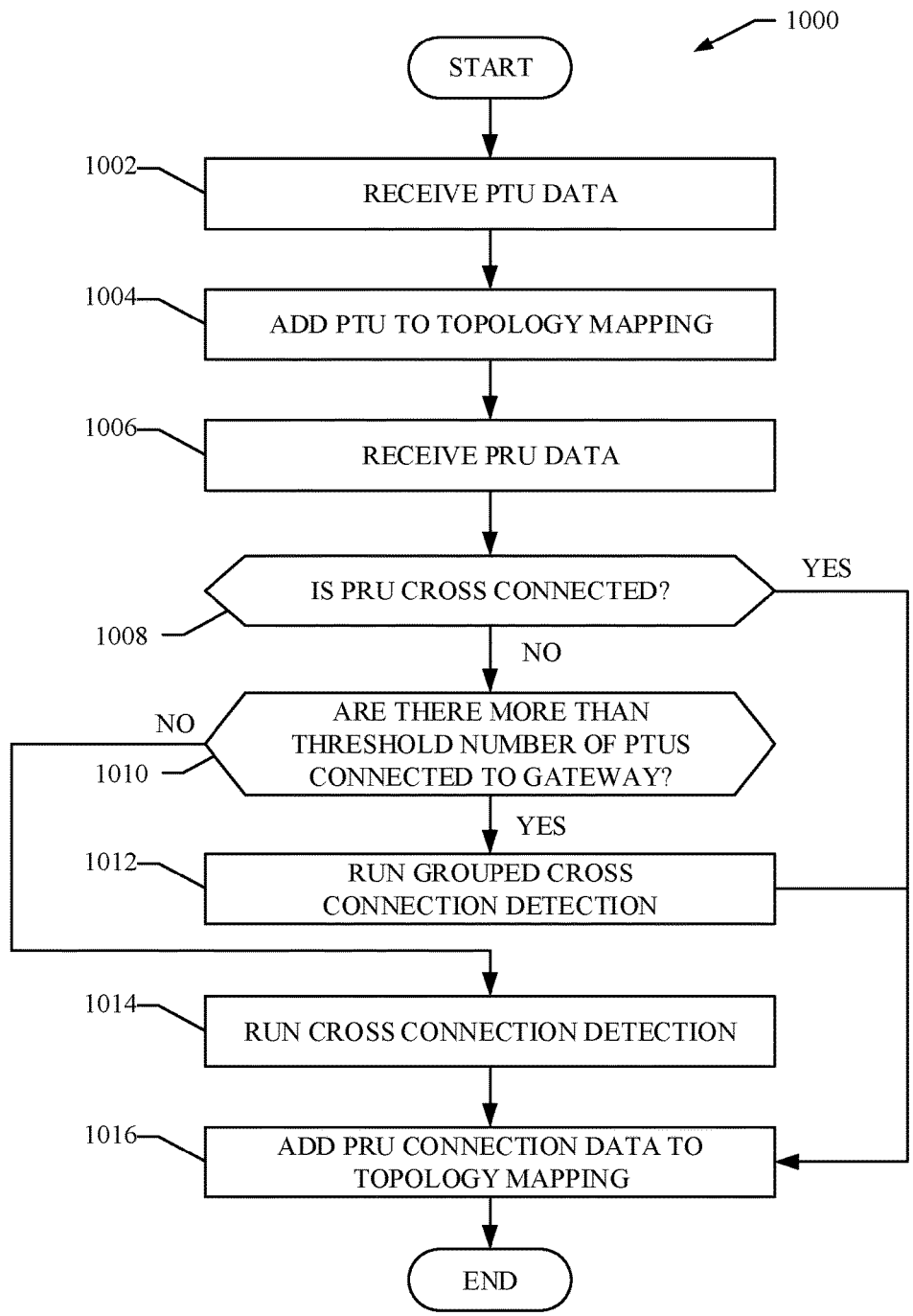
FIGS. 10-14 are flowcharts representative of example machine readable instructions that may be executed to implement the example topology communication controller of FIG. 6.

FIG. 10 is an example flowchart 1000 representative of example machine readable instructions that may be executed by the example topology communication controller 204 of FIG. 6 to develop a PTU/PRU topology mapping and facilitate a virtual connection link for a cross connected PRU.

At block 1002, the example receiver 600 receives PTU data from a PTU. As described above, the PTU data may be received periodically and/or when the PTU is powered-up. Additionally, the example topology communication controller 204 may send instructions to the PTU to transmit PTU data. At block 1004, the example topology mapping generator 602 adds the PTU to the topology mapping based on the received PTU data.

At block 1006, the example receiver 500 receives PRU data from the PTU. The PRU data indicates that a new PRU has established a connection link with the PTU. In some examples, when the PTU runs an initial cross connection detection protocol, the PRU data may include data related to whether or not a cross connection exists for the corresponding PRU. At block 1008, the example virtual connection controller 604 determines if the PRU cross connected. The determination may be based on the initial cross connection detection protocol. If, however, an initial cross connection detection protocol has not been run by the PTU, the virtual connection 604 assumes that the PRU is cross connected and assumes a cross connection detection protocol is needed. If the PRU is not cross connected, the flowchart continues to block 1016. If the PRU is, or is assumed to be, cross connected, the virtual connection controller 604 determines if there are more than a threshold number of PTUs connected to the example transmission gateway 102 based on the topology mapping. Some cross connection detection transmission protocols (e.g., time set or value set) only include a threshold number of parameters (e.g., time set values or value set values) can be used before the parameters are repeated. When parameters are repeated, the cross connection detection can lead to repeated results creating uncertainty.

Figure 11:
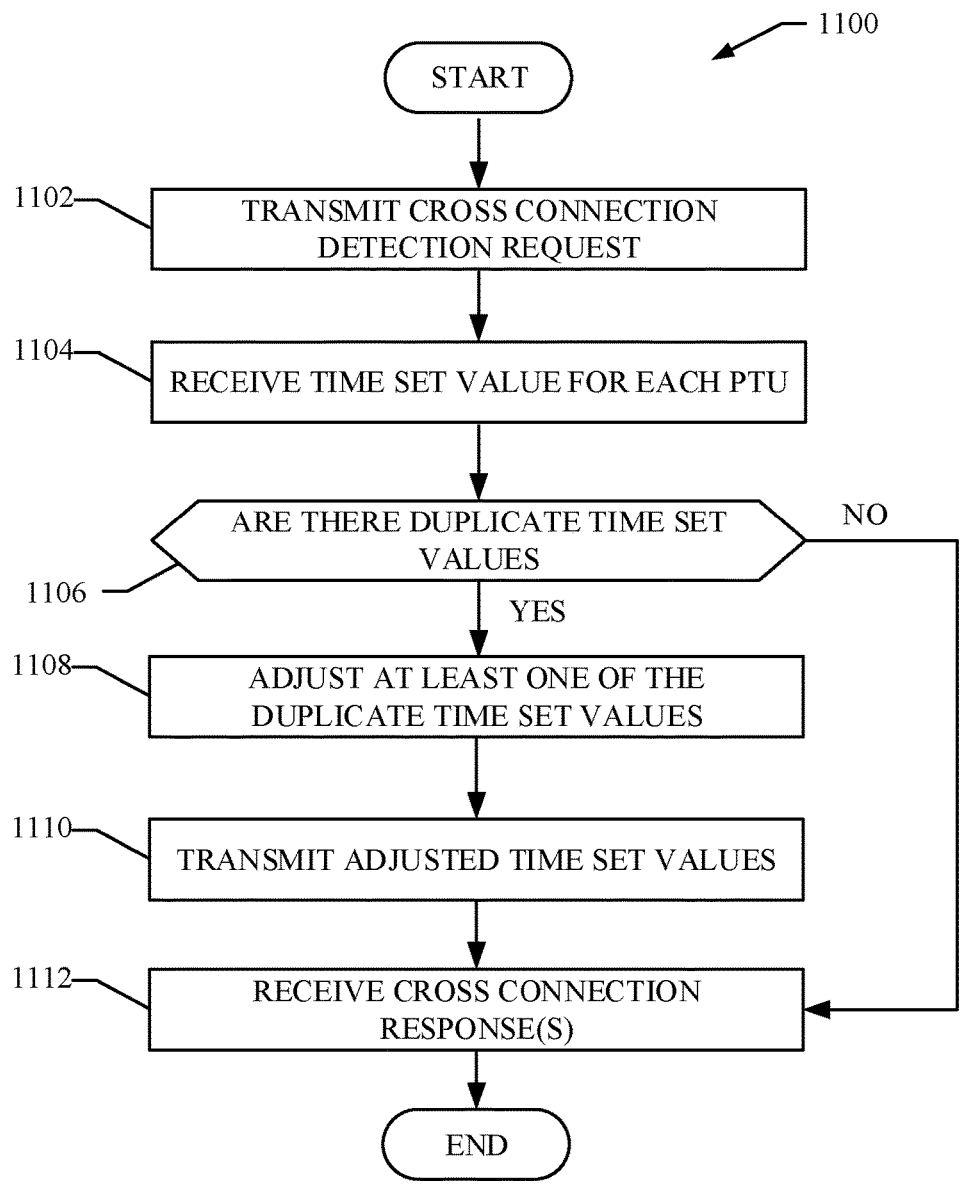
Figure 12:
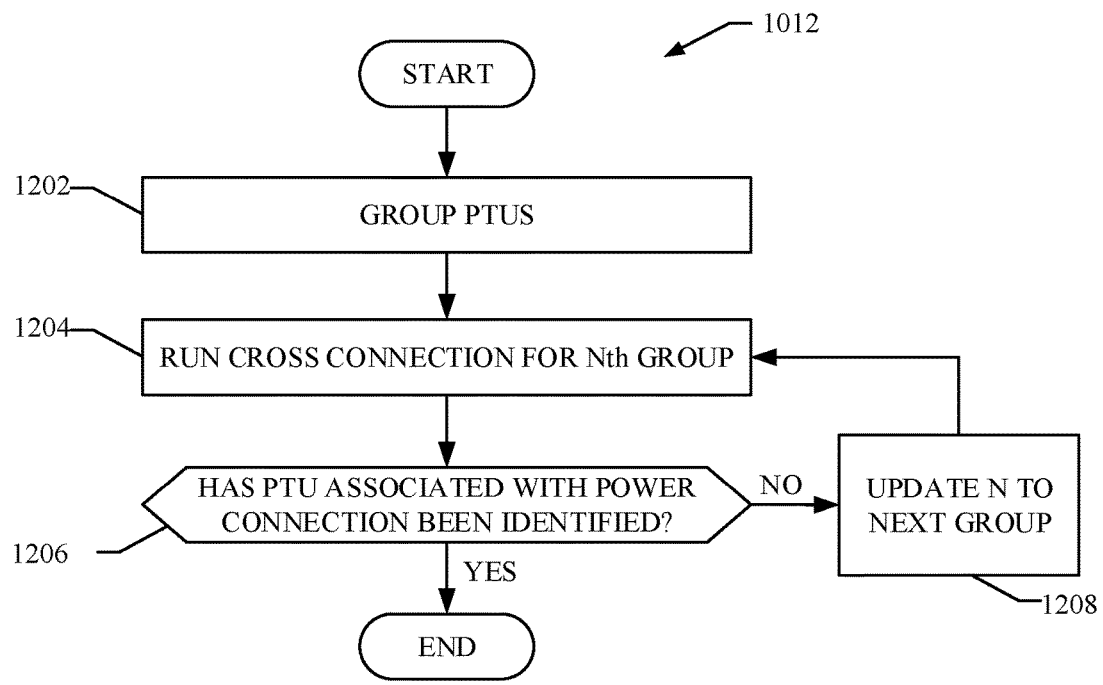

If the example topology mapping generator 602 determines that there are more than a threshold number of PTUs connected to the transmission gateway 102, the virtual connection controller 604 runs a grouped cross connection detection (block 1012), as further described in FIG. 12. If the example topology mapping generator 602 determines that there are not more than a threshold number of PTUs connected to the transmission gateway 102, the example virtual connection controller 604 runs a cross connection detection protocol (block 1014). As described above, the cross connection detection protocol instructions are sent to each PTU in the topology via the example transmitter 606. The cross connection detection protocol may be a voltage measurement cross connection detection protocol, a power measurement cross connection detection protocol, a time set cross connection detection protocol, a value set cross connection detection protocol, and/or any other type of cross connection detection protocol. In some examples, the virtual connection controller 604 determines all of the parameters of the cross connection detection protocol (e.g., a centralized assignment). For example, the virtual connection controller 604 may run a time set cross connection detection protocol, wherein the virtual connection controller 604 assigns a time set value for each of the PTUs in the PTU/PRU topology. Alternatively, the virtual connection controller 604 may run a time set cross connection detection protocol wherein the PTUs are free to select a time set value (e.g., a distributed assignment), as further described in FIG. 11.

At block 1016, the example topology mapping generator 602 adds PRU data to the topology mapping. For example, if a first PRU is connected to a first PTU and is not cross connected, the topology mapping generator 602 will add the first PRU in association with the first PTU to the topology mapping. If a second PRU is cross connected with the first PTU and a second PTU, the topology mapping generator 602 will add the second PRU in association with the first PTU and the second PTU to the topology mapping based on the cross connection data in the PTU data.

FIG. 11 is an example flowchart 1100 representative of example machine readable instructions that may be executed by the example topology communication controller 204 to run a cross connection detection protocol for all PTUs in a topology using a distributed assignment. The example flowchart 1100 is described in conjunction with the topology communication controller 204 of FIG. 6. Although the example flowchart 1100 is described in relation to a time set cross connection detection protocol, any cross connection detection protocol may be used.

At block 1102, the example virtual connection controller 604 instructs the example transmitter 606 to transmit a cross connection detection request for a PRU to some or all of the PTUs in the topology. As described above, the request does not include all of the parameters of the cross connection detection protocol (e.g., a distributed assignment). For example, if the cross connection detection protocol is a time set cross connection detection protocol, the request will not include the time set values. In such distributed assignments, the example communication forwarder 202, 203 of a PTU determines a time set value locally and transmits the determined value to the topology communication controller 204.

At block 1104, the example receiver 600 receives time set values for each PTU. At block 1106, the example virtual connection controller 604 determines if there are duplicate time set values. As described above, each time set value needs to be unique to properly cross connection data associated with a PRU. If the example virtual connection controller 604 determines that there are no duplicate time set values, the flowchart continues to block 1112. If the example virtual connection controller 604 determines that there is a duplicated time set value, the virtual connection link adjusts at least one of the duplicated time set values based on the received time set values (block 1108). For example, if the example virtual connection controller 604 received a 30 ms time set for a first PTU, a 40 ms time set for a second PTU, a 40 ms time set for a third PTU, and a 60 ms time set for a fourth PTU, the virtual connection controller 604 may adjust the time set of the second or third PTU to 50 ms.

At block 1110, the virtual connection controller 604 instructs the example transmitter 606 to transmit the adjusted time set values to the PTU(s) associated with repeated time set values. In some examples, the transmitter 606 transmits a start cross connection detection request to all PTUs in the topology. The start cross connection detection request identifies that the time set values are set for each PTU and that each PTU can begin running the cross connection detection protocol.

At block 1112, the example receiver 600 receives cross connection responses based on measured load change durations. For example, the receiver 600 may receive a measured load change duration of 30 ms. In such an example, the topology mapping generator 602 determines that the PRU is associated and/or cross connected with the first PTU because the time set value of the first PTU was 30 ms. The topology mapping generator 602 adds the PRU in association with the first PTU to the topology mapping.

FIG. 12 is an example flowchart 1012 representative of example machine readable instructions that may be executed by the example topology communication controller 204 to run the grouped cross connection detection protocol for all PTUs in a topology, as described in block 1012 of FIG. 10. The example flowchart 1012 is described in conjunction with the topology communication controller 204 of FIG. 6. Although the example flowchart 1012 is described in relation to a time set cross connection detection protocol, any cross connection detection protocol may be used.

At block 1202, the example virtual connection controller 604 groups the PTUs in the topology mapping. In some examples, the groups may be based on physical location of PTUs. The groups are no larger than a threshold number of PTUs. The threshold is based on the number of available time set values. For example, if there are five available time set values, then each group of PTUs can include no more than five PTUs.

At block 1204, the example virtual connection controller 604 instructs Nth (e.g., $1^{st}$) group of PTUs to run a cross connection detection protocol. As described above, the cross connection detection protocol may be any one of a voltage measurement cross connection detection protocol, a power measurement cross connection detection protocol, a time set cross connection detection protocol, a value set cross connection detection protocol, and/or any other type of cross connection detection protocol. Additionally, the cross connection detection protocol may be a centralized assignment or a distributed assignment.

At block 1206, the example virtual connection controller 604 determines if a PTU associated with the power connection 112 has been identified. If the power connected PTU has not been identified, the example virtual connection controller updates N to the next group (e.g., 2) (block 1208) and runs a cross connection detection for the $2^{nd}$ group (block 1204). When the example virtual connection controller 604 identifies the PTU associated with the example power connection 112, the process ends.

Figure 13:
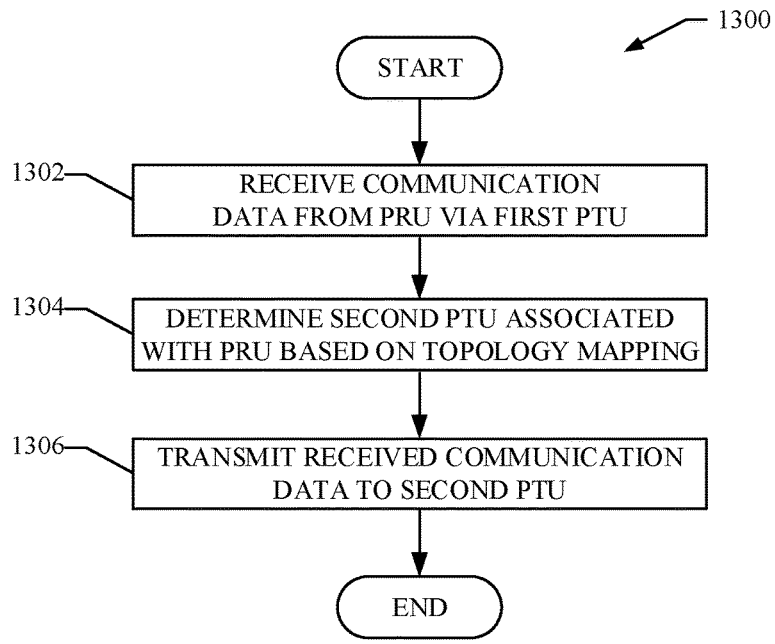

FIG. 13 is an example flowchart 1300 representative of example machine readable instructions that may be executed by the example topology communication controller 204 of FIG. 6 to facilitate a virtual connection link for the example cross connected PRU 200 of FIG. 2.

At block 1302, the example receiver 600 receives communication data from the example PRU 200 via the first example PTU 104. As described in FIG. 4, the communication data is intended for second example PTU 106. At block 1304, the example virtual connection controller 604 determines that the second example PTU 106 is connected with the example PRU 200 via the example power connection 112 based on the topology mapping generated by the example topology mapping generator 602. At block 1306, the example transmitter 606 transmits the communication data to the second example PTU 106.

Figure 14:
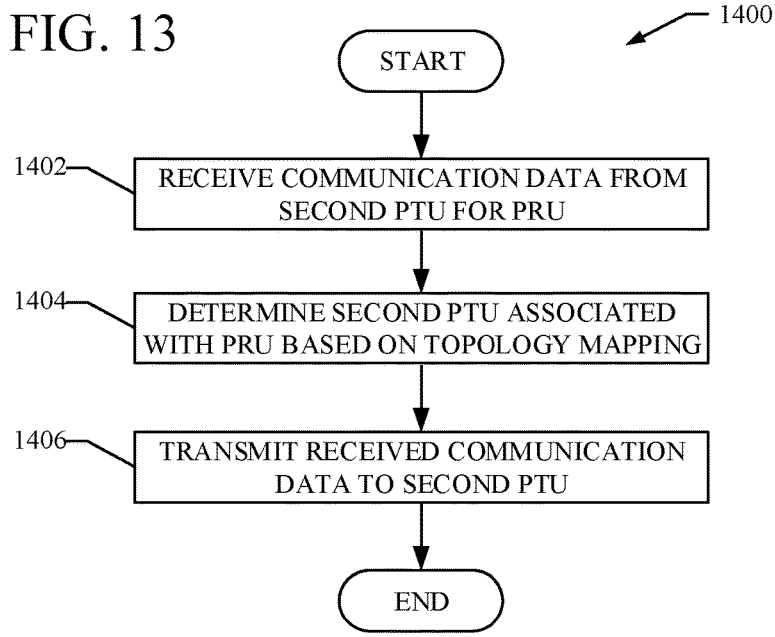

FIG. 14 is an example flowchart 1400 representative of example machine readable instructions that may be executed by the example topology communication controller 204 of FIG. 6 to facilitate a virtual connection link for the example cross connected PRU 200 of FIG. 2.

At block 1402, the example receiver 600 receives communication data from the second example PTU 106. As described in FIG. 3, the communication data is intended for the example PRU 200. At block 1304, the example virtual connection controller 604 determines that the first example PTU 104 is connected with the example PRU 200 via the example communication link 114 based on the topology generated by the example topology mapping generator 602. At block 1306, the example transmitter 606 transmits the communication data to the first example PTU 104.

Figure 15:
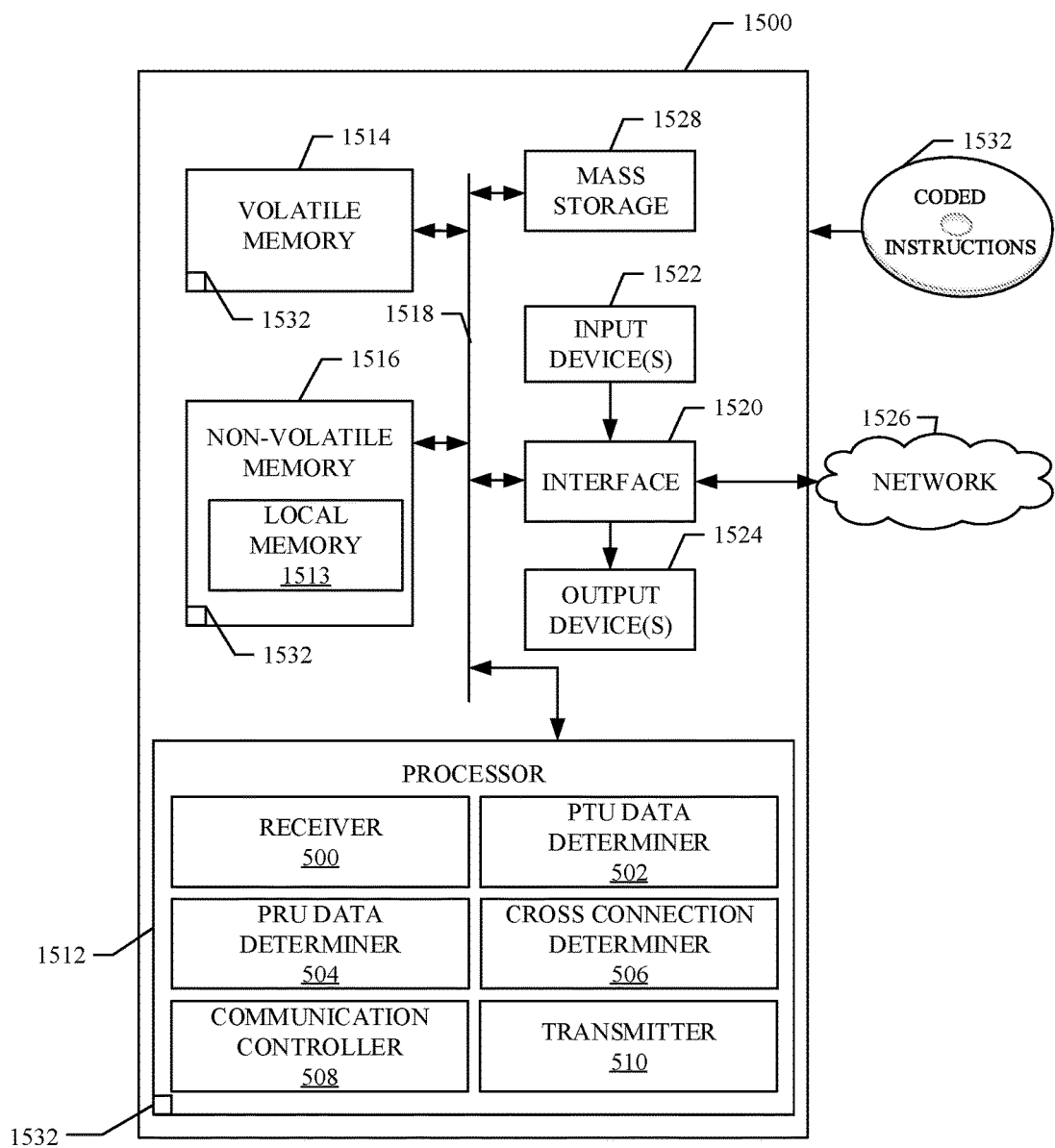
FIG. 15 is a block diagram of a processor platform structured to execute the example machine readable instructions of FIGS. 7-9 to implement the example communication forwarder of FIG. 5.

FIG. 15 is a block diagram of an example processor platform 1500 capable of executing the instructions of FIGS. 7-9 to implement the example communication forwarder 202, 203 of FIGS. 2 and 5. The processor platform 1500 can be, for example, a server, a personal computer, a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by integrated circuits, logic circuits, microprocessors or controllers from any desired family or manufacturer.

The processor 1512 of the illustrated example includes a local memory 1513 (e.g., a cache). The example processor 1512 of FIG. 15 executes the instructions of FIGS. 7-9 to implement the example receiver 500, the example PTU data determiner 502, the example PRU data determiner 504, the example cross connection determiner 506, the example communication controller 508, and/or the example transmitter 510 of FIG. 5 to implement the example communication forwarder 202, 203. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a clock controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIG. 15 may be stored in the mass storage device 1528, in the volatile memory 1514, in the non-volatile memory 1516, and/or on a removable tangible computer readable storage medium such as a CD or DVD.

Figure 16:
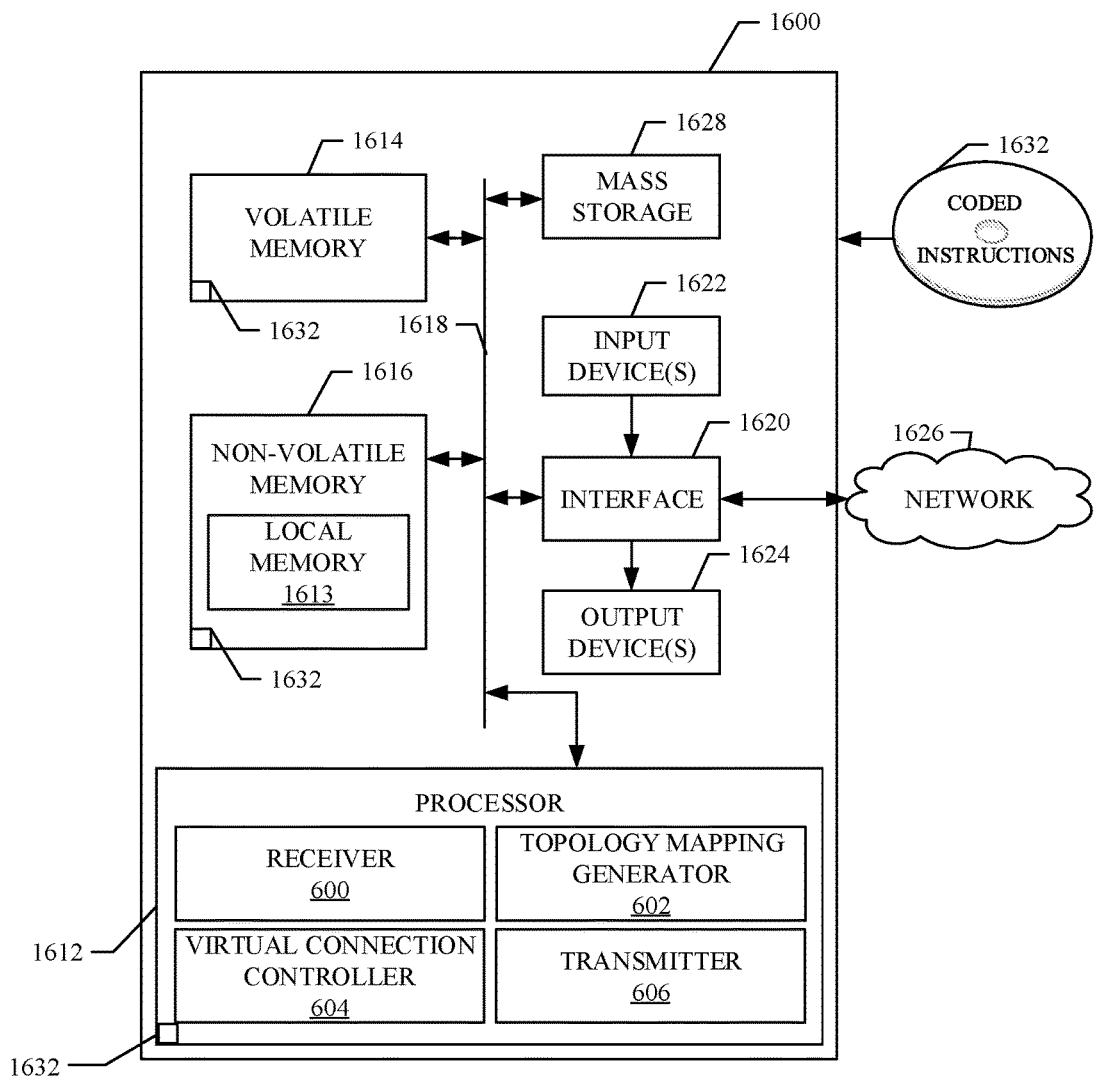
FIG. 16 is a block diagram of a processor platform structured to execute the example machine readable instructions of FIGS. 10-14 to implement the example topology communication controller of FIG. 6.

FIG. 16 is a block diagram of an example processor platform 1600 capable of executing the instructions of FIGS. 10-14 to implement the example topology communication controller 204 of FIGS. 2 and 6. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by integrated circuits, logic circuits, microprocessors or controllers from any desired family or manufacturer.

The processor 1612 of the illustrated example includes a local memory 1613 (e.g., a cache). The example processor 1612 of FIG. 16 executes the instructions of FIGS. 10-14 to implement the example receiver 600, the example topology mapping generator 602, the example virtual connection controller 604, and/or the example transmitter 606 of FIG. 6 to implement the example topology communication controller 204. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a clock controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIG. 16 may be stored in the mass storage device 1628, in the volatile memory 1614, in the non-volatile memory 1616, and/or on a removable tangible computer readable storage medium such as a CD or DVD.

From the foregoing, it would be appreciated that the above disclosed method, apparatus, and articles of manufacture generate a PTU/PRU topology mapping and a virtual connection link to facilitate communications for a cross connected PRU. Using the examples disclosed herein, a cross connected PRU can be identified in a topology and a virtual connection link can facilitate communication between a PTU and a PRU that do not share a direct connection link.

Conventional techniques of cross connection detection can identify whether a cross connection detection exists, but cannot mitigate communications for a cross connected PRU. Examples disclosed herein alleviate such problems by utilizing a transmission gateway to generate a topology mapping of connected PTUs in a network. The transmission gateway can identify a cross connection, determine details associated with the cross connection (e.g., which PTU has a connection link to a PRU and which PTU has a power connection with the PRU), and facilitate communications for a cross connected PRU via a virtual connection link.

Example 1 is a method comprising receiving first data from a first power transmitting unit (PTU), receiving second data from a second PTU, and generating a connected device mapping based on the first data and the second data.

Example 2 includes the subject matter of example 1, further including receiving third data from the first PTU, the third data corresponding to a power receiving unit (PRU) connected to the first PTU.

Example 3 includes the subject matter of example 2, further including determining that the PRU is cross connected, wherein the determination includes: in response to receiving the third data from the PTU, instructing the first PTU and second PTU to run a cross connection protocol, the cross connection protocol identifying which PTU is providing power to the PRU; when the PRU is receiving the power from the first PTU, determining that the PRU is not cross connected, and when the PRU is not receiving the power from the first PTU, determining that the PRU is cross connected.

Example 4 includes the subject matter of example 3, wherein, when the PRU is cross connected with the first PTU and the second PTU: correlating the PRU with the first PTU and the second PTU and adding the correlation to the connected device mapping.

Example 5 includes the subject matter of example 2, wherein the PRU receives power from the first PTU and communicates with the second PTU.

Example 6 includes the subject matter of example 5, further including receiving communication data from the second PTU, the communication data being generated by the PRU, determining that the communication data is intended for the first PTU based on the connected device mapping, and transmitting the communication data to the first PTU.

Example 7 includes the subject matter of example 5, further including receiving communication data from the first PTU, the communication data being generated by the first PTU, determining that the communication data is intended for the PRU based on the connected device mapping, and transmitting the communication data to the second PTU.

Example 8 includes the subject matter of example 1, 6, or 7, wherein the first data includes at least one of an identifier of the first PTU, a class of the first PTU, a power of the first PTU, a maximum power of the first PTU, a timestamp associated with power-up of the first PTU, a status of the first PTU, or a physical location of the first PTU and the second data includes at least one of an identifier of the second PTU, a class of the second PTU, a power of the second PTU, a maximum power of the second PTU, a timestamp associated with power-up of the second PTU, a status of the second PTU, or a physical location of the second PTU.

Example 9 includes the subject matter of example 2, wherein the third data includes at least one of an identifier of the PRU, a device type of the PRU, a cross connection status of the PRU, a timestamp of the PRU, a class of the PRU, a power of the PRU, a status of the PRU, or a location of the PRU.

Example 10 includes the subject matter of example 6 or 7, wherein the communication data includes data related to the power.

Example 11 includes an apparatus comprising a receiver to (A) receive first data from a first power transmitting unit (PTU) and (B) second data from a second PTU, wherein the first PTU and the second PTU are capable of providing wireless power to power receiving units. Example 11 also includes a topology mapping generator to generate a connected device mapping based on the first data and the second data.

Example 12 includes the subject matter of example 11, wherein the receiver is to receive third data from the first PTU, the third data corresponding to a power receiving unit (PRU) connected to the first PTU.

Example 13 includes the subject matter of example 12, wherein the topology mapping generator is to determine that the PRU is cross connected by, in response to receiving the third data from the PTU, instructing the first PTU and second PTU to run a cross connection protocol, the cross connection protocol identifying which PTU is providing power to the PRU. Example 13 also includes, when the PRU is receiving the power from the first PTU, determining that the PRU is not cross connected. Example 13 also includes, when the PRU is not receiving the power from the first PTU, determining that the PRU is cross connected.

Example 14 includes the subject matter of example 13, wherein the topology mapping generator is to, when the PRU is cross connected with the first PTU and the second PTU correlate the PRU with the first PTU and the second PTU and add the correlation to the connected device mapping.

Example 15 includes the subject matter of example 12, wherein the PRU receives power from the first PTU and communicates with the second PTU.

Example 16 includes the subject matter of example 15, further including a virtual connection controller and a transmitter, wherein the receiver is to receive communication data from the second PTU, the communication data being generated by the PTU, the virtual connection controller is to determine that the communication data is intended for the first PTU based on the connected device mapping, and the transmitter is to transmit the communication data to the first PTU.

Example 17 includes the subject matter of example 15, further including a virtual connection controller and a transmitter, wherein the receiver is to receive communication data from the first PTU, the communication data being generated by the first PTU, the virtual connection controller is to determine that the communication data is intended for the PRU based on the connected device mapping, and the transmitter is to transmit the communication data to the second PTU.

Example 18 includes the subject matter of example 11, 16, or 17, wherein the first data includes at least one of an identifier of the first PTU, a class of the first PTU, a power of the first PTU, a maximum power of the first PTU, a timestamp associated with power-up of the first PTU, a status of the first PTU, or a physical location of the first PTU and the second data includes at least one of an identifier of the second PTU, a class of the second PTU, a power of the second PTU, a maximum power of the second PTU, a timestamp associated with power-up of the second PTU, a status of the second PTU, or a physical location of the second PTU.

Example 19 includes the subject matter of example 12, wherein the third data includes at least one of an identifier of the PRU, a device type of the PRU, a cross connection status of the PRU, a timestamp of the PRU, a class of the PRU, a power of the PRU, a status of the PRU, or a location of the PRU.

Example 20 includes the subject matter of example 16 or 17, wherein the communication data includes data related to the power.

Example 21 includes a computer readable medium comprising instructions that, when executed, cause a machine to at least receive first data from a first power transmitting unit (PTU), receive second data from a second PTU, wherein the first PTU and the second PTU are capable of providing wireless power to power receiving units, and generate a connected device mapping based on the first data and the second data.

Example 22 includes the subject matter of example 21, wherein the instructions cause the machine to receive third data from the first PTU, the third data corresponding to a power receiving unit (PRU) connected to the first PTU.

Example 23 includes the subject matter of example 22, wherein the instructions cause the machine to determine that the PRU is cross connected by, in response to receiving the third data from the PTU, instructing the first PTU and second PTU to run a cross connection protocol, the cross connection protocol identifying which PTU is providing power to the PRU, when the PRU is receiving the power from the first PTU, determining that the PRU is not cross connected, and, when the PRU is not receiving the power from the first PTU, determining that the PRU is cross connected.

Example 24 includes the subject matter of example 23, wherein the instructions cause the machine to, when the PRU is cross connected with the first PTU and the second PTU, correlate the PRU with the first PTU and the second PTU and add the correlation to the connected device mapping.

Example 25 includes the subject matter of example 22, wherein the PRU receives power from the first PTU and communicates with the second PTU.

Example 26 includes the subject matter of example 25, wherein the instructions cause the machine to receive communication data from the second PTU, the communication data being generated by the PRU, determine that the communication data is intended for the first PTU based on the connected device mapping, and transmit the communication data to the first PTU.

Example 27 includes the subject matter of example 25, wherein the instructions cause the machine to receive communication data from the first PTU, the communication data being generated by the first PTU, determine that the communication data is intended for the PRU based on the connected device mapping, and transmit the communication data to the second PTU.

Example 28 includes the subject matter of example 21, 26, or 27, wherein the first data includes at least one of an identifier of the first PTU, a class of the first PTU, a power of the first PTU, a maximum power of the first PTU, a timestamp associated with power-up of the first PTU, a status of the first PTU, or a physical location of the first PTU and the second data includes at least one of an identifier of the second PTU, a class of the second PTU, a power of the second PTU, a maximum power of the second PTU, a timestamp associated with power-up of the second PTU, a status of the second PTU, or a physical location of the second PTU.

Example 29 includes the subject matter of example 22, wherein the third data includes at least one of an identifier of the PRU, a device type of the PRU, a cross connection status of the PRU, a timestamp of the PRU, a class of the PRU, a power of the PRU, a status of the PRU, or a location of the PRU.

Example 30 includes the subject matter of example 26 or 27, wherein the communication data includes data related to the power.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:
1. A method comprising:
  receiving first data from a first power transmitting unit (PTU);
  receiving second data from a second PTU, wherein the first PTU and the second PTU are capable of providing wireless power to power receiving units;
  generating, by executing an instruction with a processor of a gateway, a connected device association corre- sponding to the first PTU, the second PTU, and a power receiving unit (PRU) based on the first data and the second data;
responsive to obtaining communication data from the second PTU, determining that the communication data is intended for the first PTU based on the connected device association, the PRU transmitting the communication data to the second PTU and the PRU receiving power from the first PTU; and
transmitting the communication data to the first PTU.

2. The method of claim 1, further including receiving third data from the first PTU, the third data corresponding to a communication connection between the PRU and the first PTU.

3. The method of claim 2, further including determining that the PRU is cross connected by:
in response to receiving the third data from the PTU, instructing the first PTU and second PTU to run a cross connection protocol, the cross connection protocol identifying which PTU is providing power to the PRU;
when the PRU is receiving the power from the first PTU, determining that the PRU is not cross connected; and
when the PRU is not receiving the power from the first PTU, determining that the PRU is cross connected.

4. The method of claim 3, wherein, when the PRU is cross connected with the first PTU and the second PTU:
correlating the PRU with the first PTU and the second PTU; and
adding the correlation to the connected device association.

5. The method of claim 2, wherein the communication data is first communication data, further including:
receiving second communication data from the first PTU, the second communication data being generated by the first PTU;
determining that the second communication data is intended for the PRU based on the connected device association; and
transmitting the second communication data to the second PTU.

6. The method of claim 2, wherein the third data includes at least one of an identifier of the PRU, a device type of the PRU, a cross connection status of the PRU, a timestamp, a class of the PRU, a power of the PRU, a status of the PRU, or a location of the PRU.

7. The method of claim 1, wherein the communication data includes data related to the power.

8. An apparatus comprising:
a receiver to (A) receive first data from a first power transmitting unit (PTU) and (B) second data from a second PTU, wherein the first PTU and the second PTU are capable of providing wireless power to power receiving units);
a topology mapping generator to generate a connected device association corresponding to the first PTU, the second PTU, and a power receiving unit (PRU) corresponding to the first PTU, the second PTU, and a power receiving unit (PRU) based on the first data and the second data;
a virtual connection controller to, responsive to obtaining communication data from the second PTU, determine that the communication data is intended for the first PTU based on the connected device association, the PRU transmitting the communication data to the second PTU and the PRU receiving power from the first PTU; and
a transmitter to transmit the communication data to the first PTU.

9. The apparatus of claim 8, wherein the receiver is to receive third data from the first PTU, the third data corresponding to a communication connection between the PRU and the first PTU.

10. The apparatus of claim 9, wherein the topology mapping generator is to determine that the PRU is cross connected by:
in response to receiving the third data from the PTU, instructing the first PTU and second PTU to run a cross connection protocol, the cross connection protocol identifying which PTU is providing power to the PRU;
when the PRU is receiving the power from the first PTU, determining that the PRU is not cross connected; and
when the PRU is not receiving the power from the first PTU, determining that the PRU is cross connected.

11. The apparatus of claim 10, wherein the topology mapping generator is to, when the PRU is cross connected with the first PTU and the second PTU:
correlate the PRU with the first PTU and the second PTU; and
add the correlation to the connected device association.

12. The apparatus of claim 8, wherein the communication data is first communication data, wherein:
the receiver is to receive second communication data from the first PTU, the second communication data being generated by the first PTU;
the virtual connection controller is to determine that the second communication data is intended for the PRU based on the connected device association; and
the transmitter is to transmit the second communication data to the second PTU.

13. A non-transitory computer readable storage medium comprising instructions that, when executed, cause a machine to at least:
receive first data from a first power transmitting unit (PTU);
receive second data from a second PTU, wherein the first PTU and the second PTU are capable of providing wireless power to power receiving units;
generate a connected device association corresponding to the first PTU, the second PTU, and a power receiving unit (PRU) based on the first data and the second data;
responsive to obtaining communication data from the second PTU, determine that the communication data is intended for the first PTU based on the connected device association, the PRU transmitting the communication data to the second PTU and the PRU receiving power from the first PTU; and
transmit the communication data to the first PTU.

14. The non-transitory computer readable storage medium of claim 13, wherein the instructions cause the machine to receive third data from the first PTU, the third data corresponding to a communication connection between the PRU and the first PTU.

15. The apparatus of claim 8, wherein:
the first data includes at least one of an identifier of the first PTU, a class of the first PTU, a power of the first PTU, a maximum power of the first PTU, a timestamp associated with power-up of the first PTU, a status of the first PTU, or a physical location of the first PTU; and
the second data includes at least one of an identifier of the second PTU, a class of the second PTU, a power of the second PTU, a maximum power of the second PTU, a timestamp associated with power-up of the second PTU, a status of the second PTU, or a physical location of the second PTU.

16. The non-transitory computer readable storage medium of claim 13, wherein the receiver is to receive third data from the first PTU, the third data corresponding to the PRU connected to the first PTU.

17. The non-transitory computer readable storage medium of claim 14, wherein the instructions cause the machine to determine that the PRU is cross connected by:
   in response to receiving the third data from the PTU, instructing the first PTU and second PTU to run a cross connection protocol, the cross connection protocol identifying which PTU is providing power to the PRU;
   when the PRU is receiving the power from the first PTU, determining that the PRU is not cross connected; and
   when the PRU is not receiving the power from the first PTU, determining that the PRU is cross connected.

18. The non-transitory computer readable storage medium of claim 17, wherein the topology mapping generator is to, when the PRU is cross connected with the first PTU and the second PTU:
   correlate the PRU with the first PTU and the second PTU; and
   add the correlation to the connected device association.

19. The non-transitory computer readable storage medium of claim 14, further including a virtual connection controller and a transmitter, wherein the communication data is first communication data, wherein:
   the receiver is to receive second communication data from the first PTU, the second communication data being generated by the first PTU;
   the virtual connection controller is to determine that the second communication data is intended for the PRU based on the connected device association; and
   the transmitter is to transmit the second communication data to the second PTU.

20. The non-transitory computer readable storage medium of claim 13, wherein:
   the first data includes at least one of an identifier of the first PTU, a class of the first PTU, a power of the first PTU, a maximum power of the first PTU, a timestamp associated with power-up of the first PTU, a status of the first PTU, or a physical location of the first PTU; and
   the second data includes at least one of an identifier of the second PTU, a class of the second PTU, a power of the second PTU, a maximum power of the second PTU, a timestamp associated with power-up of the second PTU, a status of the second PTU, or a physical location of the second PTU.

* * * * *